United States Patent
Moon et al.

(10) Patent No.: US 12,355,162 B2
(45) Date of Patent: Jul. 8, 2025

(54) METHOD FOR TEMPORALLY/SPATIALLY SEPARATING POLARIZED BEAMS AND CORRECTING CHANNEL IRREVERSIBILITY, AND MULTI-BEAM ANTENNA DEVICE USING SAME

(71) Applicant: KMW INC., Hwaseong-si (KR)

(72) Inventors: Young Chan Moon, Suwon-si (KR); Min Seon Yun, Anyang-si (KR); Tae Youl Oh, Hwaseong-si (KR); Kyung Hoon Kwon, Incheon (KR)

(73) Assignee: KMW INC., Hwaseong-si (KR)

( * ) Notice: Subject to any disclaimer, the term of this patent is extended or adjusted under 35 U.S.C. 154(b) by 35 days.

(21) Appl. No.: 18/141,474

(22) Filed: May 1, 2023

(65) Prior Publication Data

US 2023/0268963 A1  Aug. 24, 2023

Related U.S. Application Data

(63) Continuation of application No. PCT/KR2021/015886, filed on Nov. 4, 2021.

(30) Foreign Application Priority Data

Nov. 4, 2020 (KR) .......................... 10-2020-0145879
Nov. 4, 2021 (KR) .......................... 10-2021-0150406

(51) Int. Cl.
*H01Q 3/36* (2006.01)
*H01Q 3/28* (2006.01)
(Continued)

(52) U.S. Cl.
CPC ................ *H01Q 3/36* (2013.01); *H01Q 3/28* (2013.01); *H04B 7/043* (2013.01); *H04B 7/0469* (2013.01)

(58) Field of Classification Search
CPC . H01Q 3/36; H01Q 3/28; H04B 7/043; H04B 7/0469; H04B 7/0617; H04B 7/086; H04B 7/10
See application file for complete search history.

(56) References Cited

U.S. PATENT DOCUMENTS 6,144,339 A * 11/2000 Matsumoto ........ H01Q 21/0025
342/361
2004/0043795 A1* 3/2004 Zancewicz ............. H01Q 21/06
455/562.1

(Continued)

FOREIGN PATENT DOCUMENTS

JP  2000-049524 A  2/2000
JP  2015-080077 A  4/2015

(Continued)

OTHER PUBLICATIONS

International Search Report mailed Feb. 11, 2022 for International Application No. PCT/KR2021/015886 and its English translation.

(Continued)

*Primary Examiner* — Sam K Ahn
*Assistant Examiner* — Amneet Singh
(74) *Attorney, Agent, or Firm* — Insight Law Group, PLLC; Seung Lee

(57) ABSTRACT

Disclosed are a method for temporal/spatial polarized beams and channel non-reciprocity correction and a multi-beam antenna apparatus using the same. According to one aspect of the present disclosure, a multi-beam antenna apparatus includes an array antenna including transmission antenna elements used for forming a plurality of transmission beams and reception antenna elements used for forming a plurality of reception beams. The multi-beam antenna apparatus separates polarized beams temporally and spatially by using two kinds of different orthogonal polarizations, while cor- (Continued)

rects a channel non-reciprocity which occurs due to temporal polarization separation.

15 Claims, 20 Drawing Sheets

(51) Int. Cl.
    *H04B 7/0426*     (2017.01)
    *H04B 7/0456*     (2017.01)

(56) References Cited

U.S. PATENT DOCUMENTS

| | | |
|---|---|---|
| 2009/0058725 A1 | 3/2009 | Barker et al. |
| 2016/0380690 A1 | 12/2016 | Jidhage |
| 2017/0353338 A1 | 12/2017 | Amadjikpe et al. |
| 2018/0337722 A1 | 11/2018 | Paulsen et al. |

FOREIGN PATENT DOCUMENTS

| | | |
|---|---|---|
| KR | 10-2008-0096202 A | 10/2008 |
| KR | 10-1110510 B1 | 1/2012 |
| KR | 10-2016-0147499 A | 12/2016 |

OTHER PUBLICATIONS

1 European Search Report dated Sep. 23, 2024 for Application No. 21889582.9.
Non-final office action dated Jun. 11, 2024 for the Japanese Application No. 2023-526492.

* cited by examiner

METHOD FOR TEMPORALLY/SPATIALLY SEPARATING POLARIZED BEAMS AND CORRECTING CHANNEL IRREVERSIBILITY, AND MULTI-BEAM ANTENNA DEVICE USING SAME

CROSS-REFERENCE TO RELATED APPLICATION

This application is a Continuation of International Application No. PCT/KR2021/015886, filed on Nov. 4, 2021, which claims priority to Patent Application No. 10-2020-0145879 filed in Korea on Nov. 4, 2020, and Patent Application No. 10-2021-0150406 filed in Korea on Nov. 4, 2021, which are incorporated herein by reference in their entirety.

TECHNICAL FIELD

The present disclosure relates to an antenna apparatus which may be generally used in a cellular communication system, and more particularly, to a method for temporally and spatially separating polarized beams and correcting a channel non-reciprocity which occurs due to polarization separation, and an antenna apparatus using the same.

BACKGROUND

Contents described in this section merely provide background information on the present disclosure and do not constitute the related art.

In order to meet a demand for wireless data traffic, which is on the rise after commercialization of a 4th generation (4G) communication system, efforts are being made to develop an improved 5G generation communication system or pre-5G communication system.

For this reason, the 5G communication system or the pre-5G communication system is called a beyond 4G network communication system or a post long term evolution (LTE) system.

In order to achieve a high data transmission rate, implementation of the 5G communication system in an ultra-high frequency (mmWave) band (e.g., 60 GHz band) is considered. In order to alleviate a path loss of radio waves in the ultra-high frequency band and to increase a transmission distance of the radio waves, in the 5G communication system, beamforming, massive multiple input and multiple output (MIMO), full dimensional MIMO (FD-MIMO), array antenna, and large-scale antenna technologies are being discussed.

In addition, in order to improve a network of the system, in the 5G communication system, technological development of advanced small cell, cloud radio access network (RAN), ultra-dense network, Device to Device communication (D2D), wireless backhaul, moving network, cooperative communication, Coordinated Multi-Points (CoMP), and reception interference cancellation are being made.

Besides, in the 5G system, Hybrid Frequency Shift Keying and Quadrature Amplitude Modulation (FQAM) and Sliding Window Superposition Coding (SWSC) which are advanced coding modulation (ACM) scheme, and Filter Bank Multi Carrier (FBMC), Non Orthogonal Multiple Access (NOMA), and Sparse Code Multiple Access (SCMA) which are advanced access technologies are developed.

In order to overcome a problem of the path loss due to characteristics of the ultra-high frequency band (e.g., mmWave), the 5G communication system is operated to increase a signal gain by using a beamforming technique.

SUMMARY

Technical Problem

An aspect of the present disclosure provides a method for temporally and spatially separating polarized beams by using two kinds of different orthogonal polarizations, while correcting a channel non-reciprocity which occurs due to polarization separation and a multi-beam antenna apparatus using the same.

Technical Solution

An aspect of the present disclosure provides a method for temporal/spatial polarized beams and channel non-reciprocity correction and a multi-beam antenna apparatus using the same. According to one aspect of the present disclosure, presented is a method performed by a multi-beam antenna apparatus. The multi-beam antenna apparatus comprises an array antenna which includes transmission antenna elements used for forming a plurality of transmission beams and reception antenna elements used for forming a plurality of reception beams.

The method includes generating a plurality of transmission polarization components from transmission signals corresponding to a pair of transmission channels related to each transmission beam, and outputting a pair of transmission polarization components corresponding to a first orthogonal polarization or a pair of transmission polarization components corresponding to a second orthogonal polarization among the plurality of transmission polarization components with respect to a pair of transmission channels related to each transmission beam so that spatially contiguous transmission beams have different orthogonal polarizations.

In some embodiments, in order to correct a channel non-reciprocity, the method further includes generating a plurality of reception polarization components from reception signals corresponding to a pair of reception channels related to each reception beam, and outputting a pair of reception polarization components corresponding to orthogonal polarizations of the transmission beam formed in the spatially same direction among the plurality of reception polarization components with respect to a pair of reception channels related to each reception beam. Alternatively, in order to correct a channel non-reciprocity, the method further includes generating polarization-converted signals corresponding to an orthogonal polarization of a transmission beam formed in the spatially same direction as each reception beam from reception signals corresponding to a pair of reception channels related to each reception beam.

An aspect of the present disclosure provides a multi-beam antenna apparatus using two kinds of orthogonal polarizations. The antenna apparatus comprises an array antenna including transmission antenna elements used for forming a plurality of transmission beams and reception antenna elements used for forming a plurality of reception beams. The antenna apparatus further comprises a transmission polarization composition unit for generating a plurality of transmission polarization components from transmission signals corresponding to a pair of transmission channels related to each transmission beam. The antenna apparatus further comprises a transmission polarization allocation unit for outputting a pair of transmission polarization components corresponding to a first orthogonal polarization or a pair of transmission polarization components corresponding to a second orthogonal polarization among the plurality of transmission polarization components with respect to a pair of transmission channels related to each transmission beam so that spatially contiguous transmission beams have different orthogonal polarizations.

In some embodiments, the antenna apparatus further comprises a reception polarization composition unit for generating a plurality of reception polarization components from reception signals corresponding to a pair of reception channels related to each reception beam; and a reception polarization allocation unit for outputting a pair of reception polarization components corresponding to orthogonal polarizations of the transmission beam formed in the spatially same direction among the plurality of reception polarization components with respect to a pair of reception channels related to each reception beam. Alternatively, the antenna apparatus further comprises a polarization conversion unit for generating polarization-converted signals corresponding to an orthogonal polarization of a transmission beam formed in the spatially same direction as each reception beam from reception signals corresponding to a pair of reception channels related to each reception beam.

Advantageous Effects

As described above, by adopting an array antenna including transmission antenna elements and reception antenna elements, the antenna apparatus according to the present disclosure does not require a switching operation which may worsen signal loss and a noise figure (NF) in implementing time division duplexing (TDD).

In addition, since the antenna apparatus according to the present disclosure can separate multi-beams in various orientations in a space, the antenna apparatus can extend cell coverage, and reduce a correlation between beams through polarization separation (i.e., spatial polarization separation) of the multi-beams, thereby further enhancing a communication quality.

Furthermore, the antenna apparatus according to the present disclosure performs polarization conversion for reception signals received from the reception antenna element or performs polarization composition and polarization allocation to correct the channel non-reciprocity between an uplink channel and a downlink channel which occurs due to spatial and temporal polarization separation.

Figure 1:
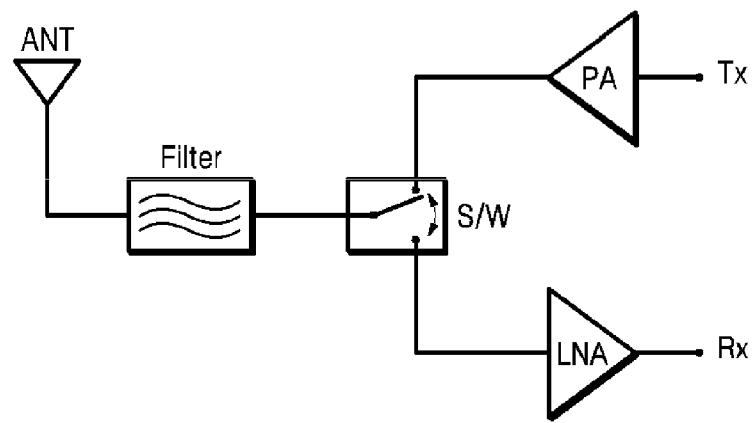
FIG. 1 is a conceptual view for describing an NF deterioration problem which occurs in a conventional antenna apparatus.

| [Explanation of Reference Numerals] | |
|---|---|
| 10: Multi-beam antenna apparatus | |
| 110: Digital processing unit | 120: RF processing unit |
| 130: Array antenna | 1310: Antenna module |
| 1312: Transmission antenna element | |
| 1314: Reception antenna element | |

DETAILED DESCRIPTION

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a conceptual view for describing an NF deterioration problem which occurs in a conventional antenna apparatus.

A conventional antenna apparatus which operates in a TDD scheme illustrated in FIG. 1 may be configured to include an antenna ANT, a filter, a switch S/W, a PA, an LNA, an AD converter (not shown), and a digital signal processor (not shown) (which may be implemented in FPGA).

The antenna ANT may have a form in which a plurality of antenna modules are arrayed, and each antenna module may be a dual polarized antenna module constituted by two radiators having a geometric orientation which are vertical to each other (i.e., having polarization characteristics orthogonal to each other). The antenna modules perform a signal transmission function when the switch S/W is connected to a transmission (Tx) line, and perform a signal reception function when the switch S/W is connected to a reception (Rx) line. Accordingly, the antenna apparatus of FIG. 1 implements a TDD function by a selective switching operation of the switch S/W.

Signal loss may occur in a transmission signal or a reception signal due to the switching operation, and the signal loss may also occur even while the reception signal is delivered to a rear end of the apparatus through a RF cable. The signal loss may cause problems of deteriorating a noise figure (NF), and limiting uplink coverage extension of a wireless communication system.

The multi-beam antenna apparatus according to the present disclosure adopts an array antenna constituted by antenna modules having a pair of dual polarized antenna elements to use one dual polarized antenna element for transmitting a radio signal and use the other one dual polarized antenna element for receiving the radio signal. Accordingly, the multi-beam antenna apparatus does not require the switching operation which may deteriorate the signal loss and the noise figure in implementing TDD.

Further, the multi-beam antenna apparatus according to the present disclosure allocates two kinds of orthogonal polarized waves to transmission channels so that spatially contiguous transmission beams have different orthogonal polarizations to spatially separate two kinds of orthogonal polarizations.

FIGS. 2A to 2D are block diagrams schematically illustrating an exemplary configuration of a multi-beam antenna apparatus capable of implementing technologies of the present disclosure.

The multi-beam antenna apparatus 10 may be an M×N multi-input multi-output (MIMO) antenna. Therefore, the antenna apparatus 10 may have M transmission channels and M reception channels. The antenna apparatus 10 may include a digital processing unit 110, an RF processing unit 120, and an antenna array 130.

Figure 2A:
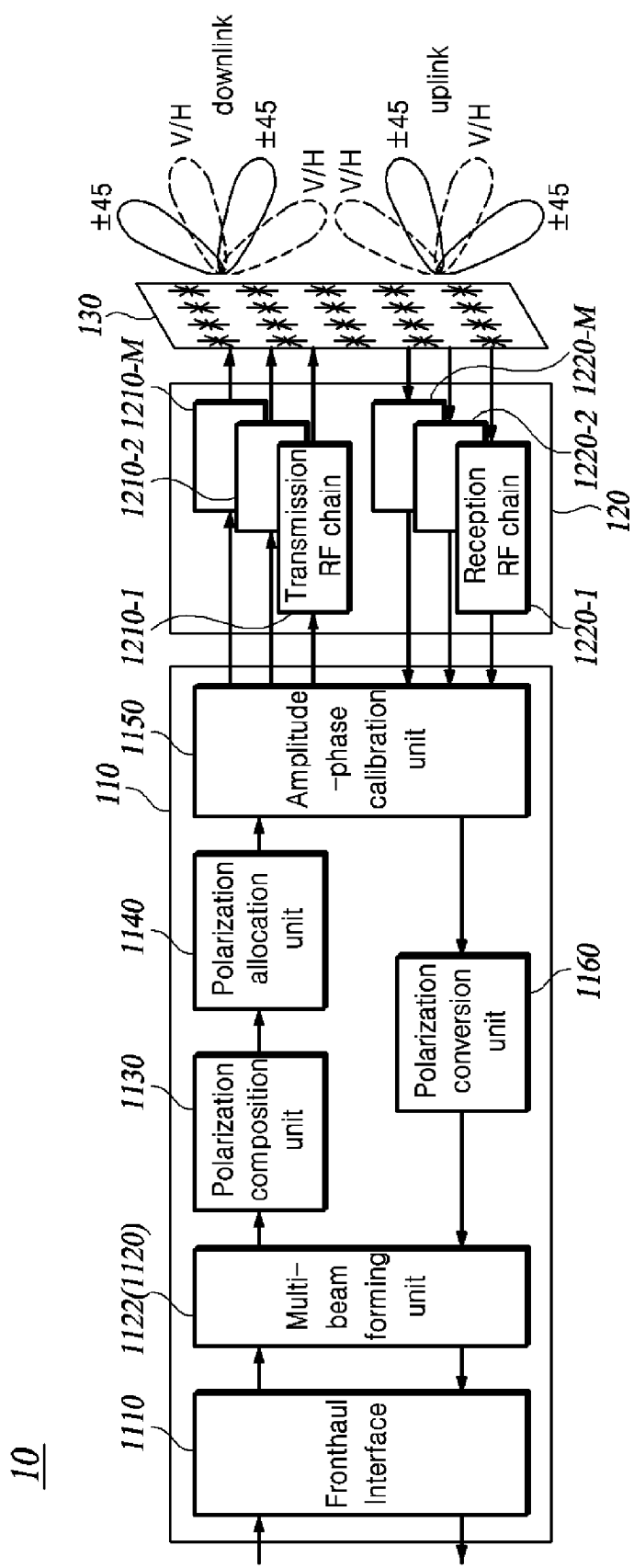
FIG. 2A to FIG. 2D each is a block diagram schematically illustrating an exemplary configuration of an antenna apparatus capable of implementing technologies of the present disclosure.
Figure 2B:
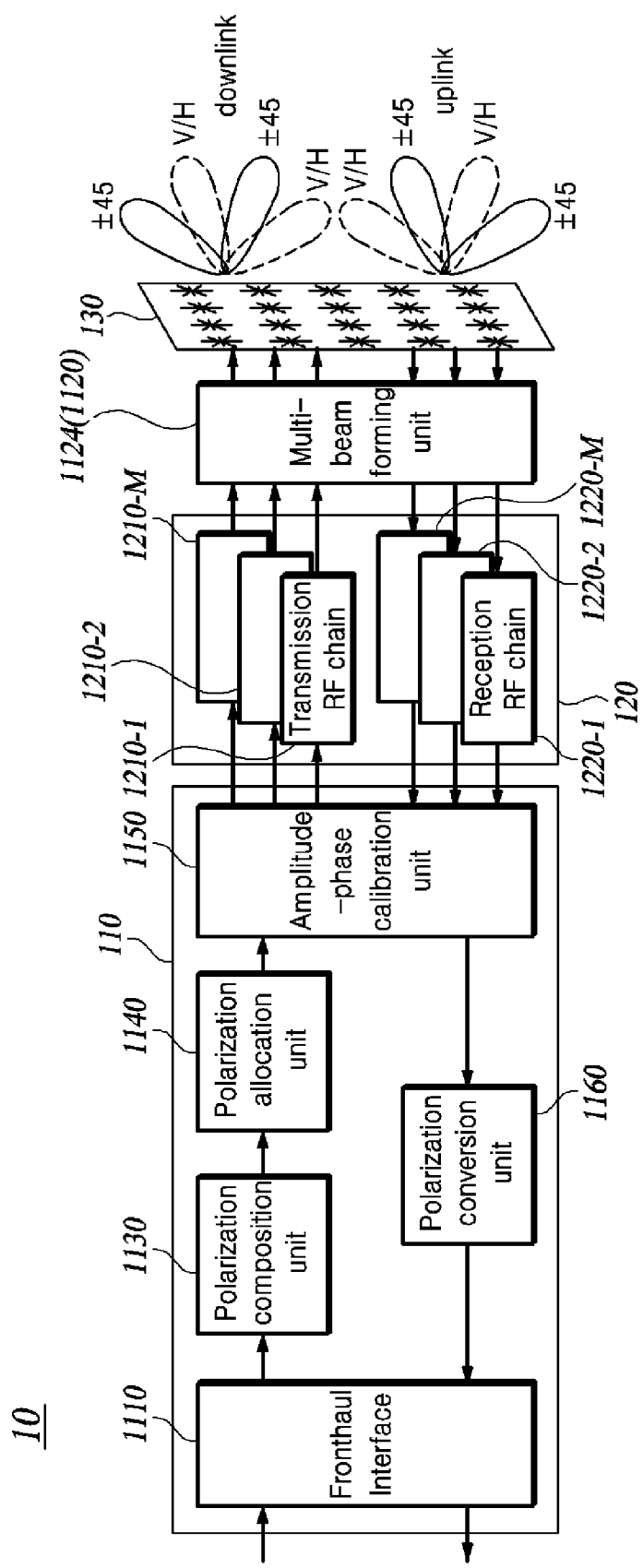
Figure 2C:
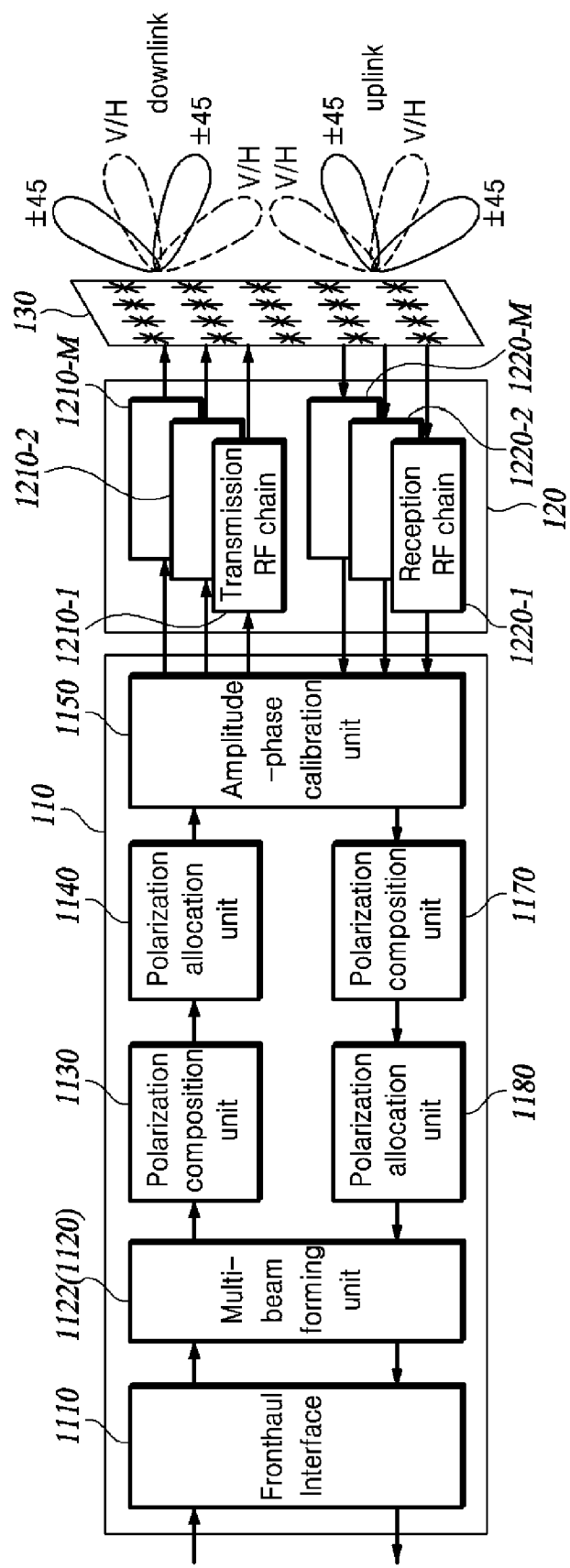
Figure 2D:
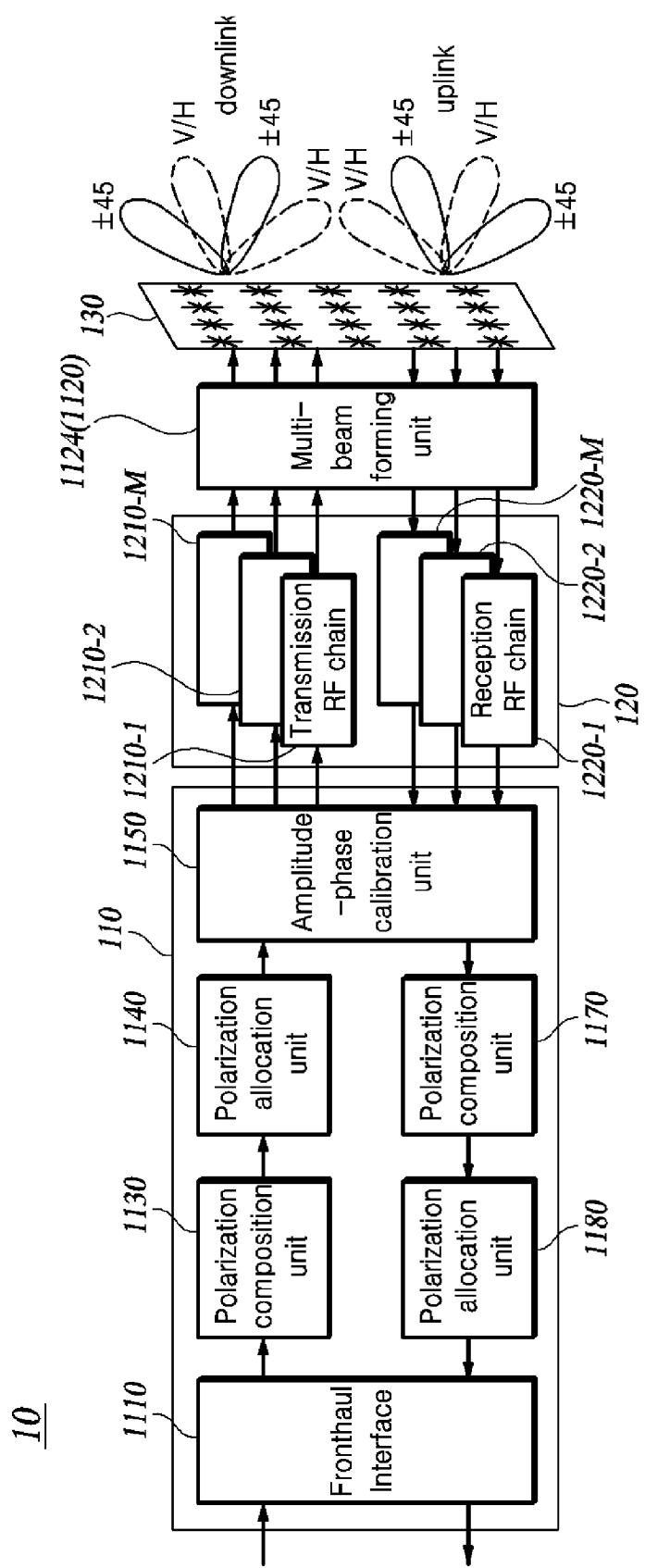

As illustrated in FIGS. 2A and 2B, the digital processing unit 110 may be configured to include a fronthaul interface 1110, a multi-beam forming unit 1120, a polarization composition unit 1130, a polarization allocation unit 1140, an amplitude-phase calibration unit 1150, and a polarization conversion unit 1160. Alternatively, as illustrated in FIGS. 2C and 2D, the digital processing unit 110 may be configured to a polarization composition unit 1170 and a polarization allocation unit 1180 instead of the polarization conversion unit 1160.

The RF processing unit 120 may be configured to include a plurality of transmission radio frequency (RF) chains 1210, 1210-1 to 1210-M, and a plurality of reception RF chains 1220, 1220-1 to 1220-M.

A configuration of the antenna apparatus 10 in FIGS. 2A to 2D should be appreciated as being an exemplary configuration drawn for the purpose of clarity. In another embodiment, any other appropriate components of the antenna apparatus 10 may be further used. Respective components of the antenna apparatus 10 may be generally implemented by using dedicated hardware, for example, by using one or more application-specific integrated circuits (ASIC), radio frequency integrated circuits (RFIC), and/or field programmable gate arrays (FPGA). Alternatively, some components may be implemented by using software executed in programmable hardware or by using a combination of hardware and software.

The array antenna 130 may include a plurality of array elements or antenna elements arranged in a plurality of rows and a plurality of columns. In some embodiments, each array element may be a dual polarized antenna element having dual polarization characteristics. Each of the plurality of array elements may be divided into a transmission antenna element and a reception antenna element. The transmission antenna element may be used for transmission of signal and the reception antenna element may be used for reception of the signal. Orthogonal polarization characteristics of the transmission antenna element and the orthogonal polarization characteristics of the reception antenna element may be the same as each other and also different from each other. In some other embodiments, each array element may also be a quadruple polarized antenna element having quadruple polarization characteristics. The polarization characteristics and the structure of the array element will be described below with reference to FGIS. 3A to 3D.

The antenna apparatus 10 may implement a polarization diversity by using the orthogonal polarization characteristics provided by the array antenna 130. The antenna apparatus 10 may allocate dual orthogonal polarizations to two transmission channels (or transmission signals) related to each transmission beam. The orthogonal polarization allocated to the transmission channels may also be the same as or different from the dual orthogonal polarization characteristics of the transmission antenna element included in the array antenna 130.

The antenna apparatus 10 may generate a transmission beam having a different orthogonal polarization from the orthogonal polarization characteristics of the transmission antenna element through polarization composition, and form a reception beam corresponding to an orthogonal polarization different from the orthogonal polarization characteristics of the reception antenna element through the polarization composition (that is, generate a signal component corresponding to the orthogonal polarization different from the orthogonal polarization characteristics of the reception antenna element).

The antenna apparatus 10 allocates two kinds of orthogonal polarizations to the transmission channels so that spatially adjacent beams have different orthogonal polarizations to spatially separate two kinds of orthogonal polarizations.

In the following description, two kinds of orthogonal polarizations are an orthogonal polarization constituted by ±45° linear polarized waves and an orthogonal polarization constituted by vertical/horizontal (V/H) linear polarized waves, but the technologies of the present disclosure are also applicable to a combination of the orthogonal linear polarized waves and an orthogonal circular polarized wave constituted by left circular/right circular polarized waves.

In the following description, the polarization composition unit 1130 and the polarization allocation unit 1140 positioned in a transmission path may be referred to as a transmission polarization composition unit 1130 and a transmission polarization allocation unit 1140, respectively, and the polarization composition unit 1170 and the polarization allocation unit 1180 positioned in a reception path may also be referred to as a reception polarization composition unit 1170 and a reception polarization allocation unit 1180, respectively.

Transmission Signal Processing

Transmission signals of M transmission channels may be radiated through the array antenna 130 via transmission paths constituted by the multi-beam forming unit 1120, the polarization composition unit 1130, the polarization allocation unit 1140, the amplitude-phase calibration unit 1150, and the transmission RF chains 1210-1 to 1210-M in a beam form. Each of the transmission channels has a corresponding transmission path. Here, the transmission signal may also be referred to as a downlink signal. The transmission path refers to a path through which the transmission signal proceeds in the antenna apparatus 10. Therefore, the transmission path may also be referred to as "path through which the transmission signal proceeds" or "path in which the transmission signal is processed".

First, the transmission signals input through the fronthaul interface 1110 are input into the polarization composition unit 1130 to go through a polarization composition process. The polarization composition unit 1130 may compose four polarization components for each of a pair of transmission signals to be radiated through a transmission antenna element to be described below, and output the polarization components to the polarization allocation unit 1140. The polarization components output from the polarization composition unit 1130 may also be referred to as "polarized signals". It is important that the polarization components composed by the polarization composition unit 1130 are fed to the array antenna 130 via subsequent components and radiated to a free space, and as a result, substantial polarization composition is made.

The polarization allocation unit 1140 may determine orthogonal polarizations to be allocated to two transmission channels (or two transmission signals) related to each transmission beam so that the spatially adjacent transmission beams have different orthogonal polarizations. The polarization allocation unit 1140 may output some of four polarization components composed by the polarization composition unit 1130 to two transmission paths to correspond to the determined orthogonal polarizations. The polarization components output to each transmission path may also be referred to as "polarization components (polarized signals) of the transmission signal", "polarization components (polarized signals) of the transmission channel", or "transmission polarization components (transmission polarized signals)". The orthogonal polarization of the transmission beam may be determined according to orthogonal polarization characteristics of the polarization components and the transmission antenna element output from the polarization allocation unit 1140. Polarization composition which occurs in the transmission antenna element according to polarization composition and polarization allocation will be described below with reference to FIG. 4.

In order to compensate for variations of amplitude and phase characteristics between the transmission RF chains 1210-1 to 1210-M, the polarization components of the respective transmission signals are input into the amplitude-phase calibration unit 1150 prior to reaching the transmission RF chains 1210-1 to 1210-M. The amplitude and phase characteristics of the RF transmission path are related to an amplitude change and a phase change which appear as an RF signal moves along an RF transmission path provided by a transmission RF chain.

The amplitude-phase calibration unit 1150 performs a function of compensating for the variations of the amplitude and phase characteristics between the transmission RF chains 1210-1 to 1210-M. Since the variation of the amplitude characteristic influences beamforming is slight, it is common to calibrate only a phase equally for all paths. However, since accuracy of the polarized wave composition which occurs in the antenna array 130 according to the present disclosure significantly depends on amplitudes and phases of composed radio signals, the calibration of the amplitude and the phase increases the accuracy of the polarization composition.

The polarization components of the transmission signal which goes through the amplitude-phase calibration process may be converted into an analog signal and subjected to RF signal processing by the transmission RF chain 1210. The transmission RF chain 1210 may be configured to include a digital to analog converter (DAC), a filter, a mixer for frequency up-conversion, and a power amplifier (PA).

The transmission signal RF signal-processed and converted into the analog signal by the transmission RF chain 1210 may be radiated through the array antenna 130 in the beam form.

The multi-beam forming unit 1120 may precode the transmission signals so that multi-beams are formed by the array antenna 130. A location of the multi-beam forming unit 1120 on the transmission path of the antenna apparatus 10 may vary depending on whether a weight vector (or precoding matrix) is used in a baseband or whether the weight vector is used in an RF band.

First, as in an example of FIG. 2A or 2C, the multi-beam forming unit 1122 may be positioned preceding the transmission polarization composition unit 1130 in the transmission path of the signal. The multi-beam forming unit 1122 performs digital beamforming. In this case, the weight vector or the precoding matrix is applied to (baseband) digital transmission signals by the multi-beam forming unit 1122, which may be converted into a plurality of precoded signals.

The digital transmission signal may be branched into a plurality of signals having phases and amplitudes different according to the applied weight vector. Further, the branched signals are reinforced and interfered in a specific angle or orientation (an orientation in which communication resources are concentrated) through the array antenna 130 to be radiated in the beam form. Therefore, an orientation and a shape of the beam may be determined according to a value of the weight vector applied to the digital transmission signal.

Next, as in an example of FIG. 2B or 2D, the multi-beam forming unit 1124 may be positioned after the transmission RF chain 1210 in a transmission process of the signal. Therefore, the multi-beam forming unit 1124 may perform analog beamforming. In this case, the multi-beam forming unit 1124 may branch the analog signal received from each transmission RF chain 1210 into multiple paths, and control phases and amplitudes of the respective branched signals. The beam forming unit 1124 may be configured to include multiple phase shifters controlling the phases of the respective branched signals and multiple power amplifiers controlling the amplitudes of the respective branched signals. That is, the phase shifter and the power amplifier process the weight vector in an analog domain. The analog signals of which phases and amplitudes are controlled are reinforced and interfered in a specific angle or direction through the array antenna 130 to be radiated in the beam form. Here, a function of the transmission RF chain 1210 may also be performed by the multi-beam forming unit 1224 substantially constituted by analog components, so the transmission RF chain 1210 may also be removed from the antenna apparatus 10.

Reception Signal Processing

Reception signals (or uplink signals) corresponding to M reception channels may be received through the array antenna 130, and then processed through the reception paths constituted by the reception RF chain 1220, the amplitude-phase calibration unit 1150, the polarization conversion unit 1160 (alternatively, the reception polarization composition unit 1170 and the reception polarization allocation unit 1180), and the multi-beam forming unit 1120. The respective reception channels have corresponding reception paths. Here, the reception signal may also be referred to as uplink signal. The reception path refers a path in which the reception signal proceeds in the antenna apparatus 10. Therefore, the reception path may also be referred to as "path through which the reception signal proceeds" or "path in which the reception signal is processed".

The analog reception signals received through the array antenna 130 may be subjected to Rf-signal processing by corresponding reception RF chains 1220-1 to 1220-M. Each reception RF chain 1220 may be configured to include an analog to digital converter (ADC), a mixer for frequency down-conversion, and a low noise amplifier (LNA).

The reception signal converted into the digital signal via the reception RF chain 1220 may go through a process of calibrating the variations of the amplitude and phase characteristics between the reception RF chains 1220-1 to 1220-M by the amplitude-phase calibration unit 1150.

With respect to the transmission beam and the reception beam formed in the same spatial direction, the orthogonal polarization (changed by orthogonal polarization allocation of the transmission polarization allocation unit 1140) may also be the same as or different from the orthogonal polarization of the reception signal (defined by the orthogonal polarization characteristics of the reception antenna element). As described below, when the orthogonal polarization is different from the orthogonal polarization of the reception signal, radio channel characteristics are different between the uplink and the downlink, and as a result, a downlink/ uplink channel reciprocity is not established.

As illustrated in FIGS. 2A and 2B, the antenna apparatus 10 may include the polarization conversion unit 1160 correcting the channel non-reciprocity by using the polarization conversion. The polarization conversion unit 1160 performs the polarization conversion for the reception signals output from the amplitude-phase calibration unit 1150 to output polarization-converted signals having the same orthogonal polarization as the orthogonal polarization of the transmission beam.

For example, when the transmission beam has a ±45° orthogonal polarization and the reception antenna element has the V/H orthogonal polarization characteristics, the polarization conversion unit 1160 performs polarization conversion for the reception signals of the V/H polarization to output polarization converted signals having the same orthogonal polarization)(±45° as the orthogonal polarization of the transmission beam. As another example, when the transmission beam has the V/H orthogonal polarization and the reception antenna element has the V/H orthogonal polarization characteristics, the orthogonal polarization of the transmission beam and the orthogonal polarization of the reception signal are the same as each other, so the polarization conversion unit 1160 may not perform the polarization conversion for the reception signals.

Alternatively, as illustrated in FIGS. 2C and 2D, the antenna apparatus 10 may include the polarization composition unit 1170 and the polarization allocation unit 1180 that correct the channel non-reciprocity by using the polarization composition and the polarization allocation.

The polarization composition unit 1170 may compose four polarization components for each of a pair of reception signals received through each reception antenna element, and output the polarization components to the polarization allocation unit 1180. The polarization components output from the polarization composition unit 1170 may also be referred to as "polarized signals".

The polarization allocation unit 1180 may determine orthogonal polarizations to be allocated to two reception channels (or two reception signals) related to each reception antenna element. The polarization allocation unit 1180 may allocate the same orthogonal polarization as the orthogonal polarization (or the orthogonal polarization of the transmission beam) set in two corresponding transmission channels to two reception channels.

The polarization allocation unit 1180 may output two polarization components to be transmitted to a digital unit (DU) through the fronthaul interface 1110 among four polarization components composed by the polarization composition unit 1170 to correspond to the determined orthogonal polarizations. The polarization components allocated to each reception channel may be referred to as "polarization components (polarized signals) of the reception channel" or "polarization components (polarized signals) of the reception channel" or "reception polarization components (reception polarized signals)".

For example, when the ±45° orthogonal polarizations are set in two transmission channels (therefore, the transmission beam has the ±45° orthogonal polarization), and the reception antenna element has the V/H orthogonal polarization characteristics, the polarization allocation unit 1180 may output two polarization components corresponding to the ±45° orthogonal polarizations among four polarization components composed by the polarization composition unit 1170. As another example, when the V/H orthogonal polarizations are set in two transmission channels (therefore, the transmission beam has the V/H orthogonal polarization), and the reception antenna element has the V/H orthogonal polarization characteristics, the polarization allocation unit 1180 may output two polarization components corresponding to the V/H orthogonal polarizations among four polarization components composed by the polarization composition unit 1170.

A detailed description of the channel non-reciprocity, and an operation of the polarization conversion unit 1160 for calibrating the channel non-reciprocity, and operations of the polarization composition unit 1170 and the polarization allocation unit 1180 will be made below with reference to FIGS. 9, FIG. 10A, FIG. 10B, FIG. 11A and FIG. 11B.

The reception signals may include a plurality of signals having different phases and amplitudes, which correspond to the related reception antenna elements. The multi-beam forming unit 1120 adjusts the phases and amplitudes of the plurality of signals, and then aggregates the adjusted signals to generate or reconstruct the reception signal. This process may be appreciated as an opposite process to a process in which the multi-beam forming unit 1120 forms the plurality of signals having different phases and amplitudes from the transmission signal. To this end, as illustrated in FIGS. 2A and 2C, the multi-beam forming unit 1122 is positioned after the polarization composition unit 1160 and the reception polarization allocation unit 1180 in the reception path to perform the digital beamforming, or as illustrated in FIGS. 2B and 2D, the multi-beam forming unit 1122 is positioned between the array antenna 130 and the reception RF chain 1220 in the reception path to perform the analog beamforming. In FIG. 2B, a function of the reception RF chain 1220 may also be performed by the multi-beam forming unit 1224 substantially constituted by analog components, so the reception RF chain 1210 may also be removed from the antenna apparatus 10.

DU and RU

Meanwhile, in a so-called "stand-alone base station", signal processing functions corresponding to the digital unit (DU) and a radio unit (RU), respectively are included in one physical system, and one physical system is installed in a service target area. Contrary to this, according to a cloud radio access network (C-RAN) architecture, the DU and the RU are physically separated, and only the RU is installed in the service target area, and a BBU pool which is centralized DUs has a control management function for a plurality of RUs forming each independent cell.

The DU as a part which takes charge of digital signal processing and resource management control functions is connected to a core network through backhaul. The RU as a part which takes charge of a radio signal processing function converts the digital signal received from the DU into a radio frequency signal according to a frequency band, and amplifies the radio frequency signal, and converts the RF signal received by the antenna into the digital signal, and transmits the digital signal to the DU.

The antenna apparatus 10 may be installed in the stand-alone base station in which the DU and the RU are included in one physical system, or also installed in the RU in a C-RAN structure in which the DU and the RU are physically separated. Hereinafter, an example in which the antenna apparatus 10 is installed in the RU in the C-RAN structure will be primarily described.

The baseband signal may be a signal which goes through baseband processing such as a scrambling process, a modulation process, and a layer mapping process. The scrambling process corresponds to a process of encrypting the baseband signal by using a scramble signal in order to distinguish a base station or a terminal. The modulation process corresponds to a process of modulating scrambled signals into a plurality of modulation symbols. The scrambled signal is input into a modulation mapper (not illustrated) to be modulated through a binary phase shift keying (BPSK), quadrature phase shift keying (QPSK), or 16QAM/64QAM (quadrature amplitude modulation) scheme. The layer mapping process corresponds to a process of mapping the modulation symbols to one or more transmission layers in order to separate the signals for each antenna. With respect to the modulation symbols obtained through the modulation process, a process of mapping the modulation symbols to resource elements may be further performed.

When the antenna apparatus 10 is installed in the RU in the C-RAN structure, the above processes may be performed by the centralized DU. On the contrary, when the antenna apparatus 10 is installed in the stand-alone base station, the above processes may be performed by the DU in the base station.

Exchange of signals or data between the DU and the RU is made through the fronthaul or a fronthaul link. The fronthaul link is a link connecting the DU and the RU in a cellular radio access network. The fronthaul interface 1110 of the antenna apparatus 10 may be implemented to conform to standards such as Common Public Radio Interface (CPRI), enhanced CPRI (eCPRI), Open Radio Equipment Interface (ORI), Open Base Station Architecture Initiative (OBSAI), etc.

When the antenna apparatus 10 of the present disclosure is implemented in the RU, the antenna apparatus 10 may be divided into the digital processing unit 110, the RF processing unit 120, and the array antenna 130.

The RF processing unit 120 takes charge of analog signal processing for the transmission signals and the reception signals. The RF processing unit 120 may be configured to include the RF chains 1210 and 1220 as illustrated in FIG. 2A, or configured to include the RF chains 1210 and 1220, and the multi-beam forming unit 1124 as illustrated in FIG. 2B.

The digital processing unit 110 takes charge of the digital signal processing for the transmission signals and the reception signals. The digital processing unit 110 may be implemented as a digital front end (DFE). The DFE means replacing the existing analog function blocks with a digital signal processing (DSP) block. When the digital processing unit 110 is implemented as the DFE, a design consumption time, power consumption, and an area may be reduced, and a flexibility capable of multiple modes and multiple bands may be secured.

The digital processing unit 110 may further perform an inverse fast Fourier transform (IFFT) operation and an FFT operation for the polarization-converted signals. Further, the digital processing unit 110 may insert a guard interval in order to prevent inter-symbol interference (ISI). To this end, the digital processing unit 110 may be configured to further include an IFFT unit (not illustrated)/FFT unit (not illustrated), and a cyclic prefix (CP) (not illustrated).

Antenna Elements of Array Antenna

FIGS. 3A to 3D are diagrams for describing various structures and orthogonal polarization characteristics of the antenna module 1310 which may be adopted in the array antenna 130 of the antenna system of the present disclosure.

As illustrated in FIGS. 3A to 3D, the antenna module 1310 may be constituted by a pair of a transmission antenna element 1312 corresponding to a transmitting antenna and a reception antenna element 1314 corresponding to a receiving antenna. The transmission antenna element 1312 is connected to transmission lines Tx1 and Tx2 to be used for transmitting the signal, and the reception antenna element 1314 is connected to reception lines Rx1 and Rx2 to be used for receiving the signal.

The transmission antenna element 1312 is a dual polarized antenna element including two radiators having polarization characteristics orthogonal to each other, and the reception antenna element 1314 is also a dual polarized antenna element including two radiators having polarization characteristics orthogonal to each other.

Figure 3A:
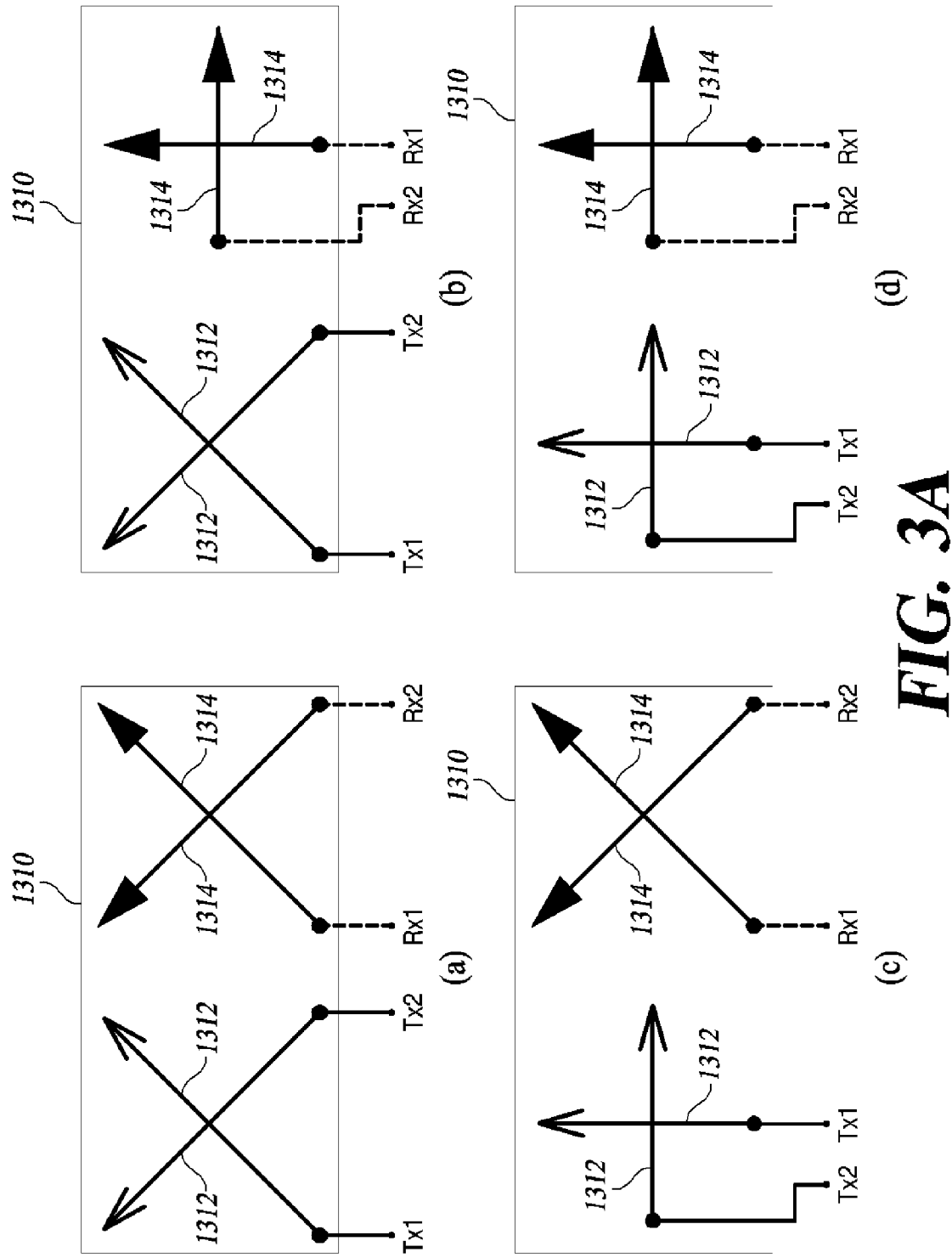
FIG. 3A to FIG. 3D are diagrams for describing various examples for an antenna module which may be adopted in an antenna system of the present disclosure.

The orthogonal polarization characteristics of the transmission antenna element 1312 and the orthogonal polarization characteristics of the reception antenna element 1314 may be different (for example, see (b) and (c) of FIG. 3A). For example, the radiators included in the transmission antenna element 1312 may have +45° and −45° polarization characteristics, respectively, and the radiators included in the reception antenna element 1314 may have the V and H polarization characteristics, respectively. As another example, the radiators included in the transmission antenna element 1312 may have the V and H polarization characteristics, respectively, and the radiators included in the reception antenna element 1314 may have the +45° and −45° polarization characteristics, respectively. That is, the antenna module 1310 may provide two kinds of orthogonal polarization characteristics including dual orthogonal polarizations of the transmission antenna element 1312 and dual orthogonal polarizations of the reception antenna element 1314.

The orthogonal polarization characteristics of the transmission antenna element 1312 and the orthogonal polarization characteristics of the reception antenna element 1314 may also be the same as each other (for example, see (a) and (d) of FIG. 3A). In the embodiment in which the antenna module 1310 is adopted, as described below with reference to FIG. 4, a beam radiated from the transmission antenna element 1312 may have a different dual orthogonal polarization orientation from the dual polarization characteristics of the transmission antenna element 1312 by relying on polarization components of transmitted signals to be delivered through the transmission lines Tx1 and Tx2. Therefore, even when the antenna module 1310 illustrated in (a) and (d) of FIG. 3A, the antenna apparatus 10 may use different dual orthogonal polarizations between the transmission beam and the reception beam.

In the antenna module 1310 illustrated in FIG. 3A, two radiators constituting the transmission antenna element 1312 are arranged to cross each other at a first intersection, and the radiators constituting the reception antenna element 1314 are arranged to cross each other at a second intersection. As a distance between the first intersection and the second intersection decreases, the efficiency of an area occupied by the antenna module 1310 increases.

Figure 3B:
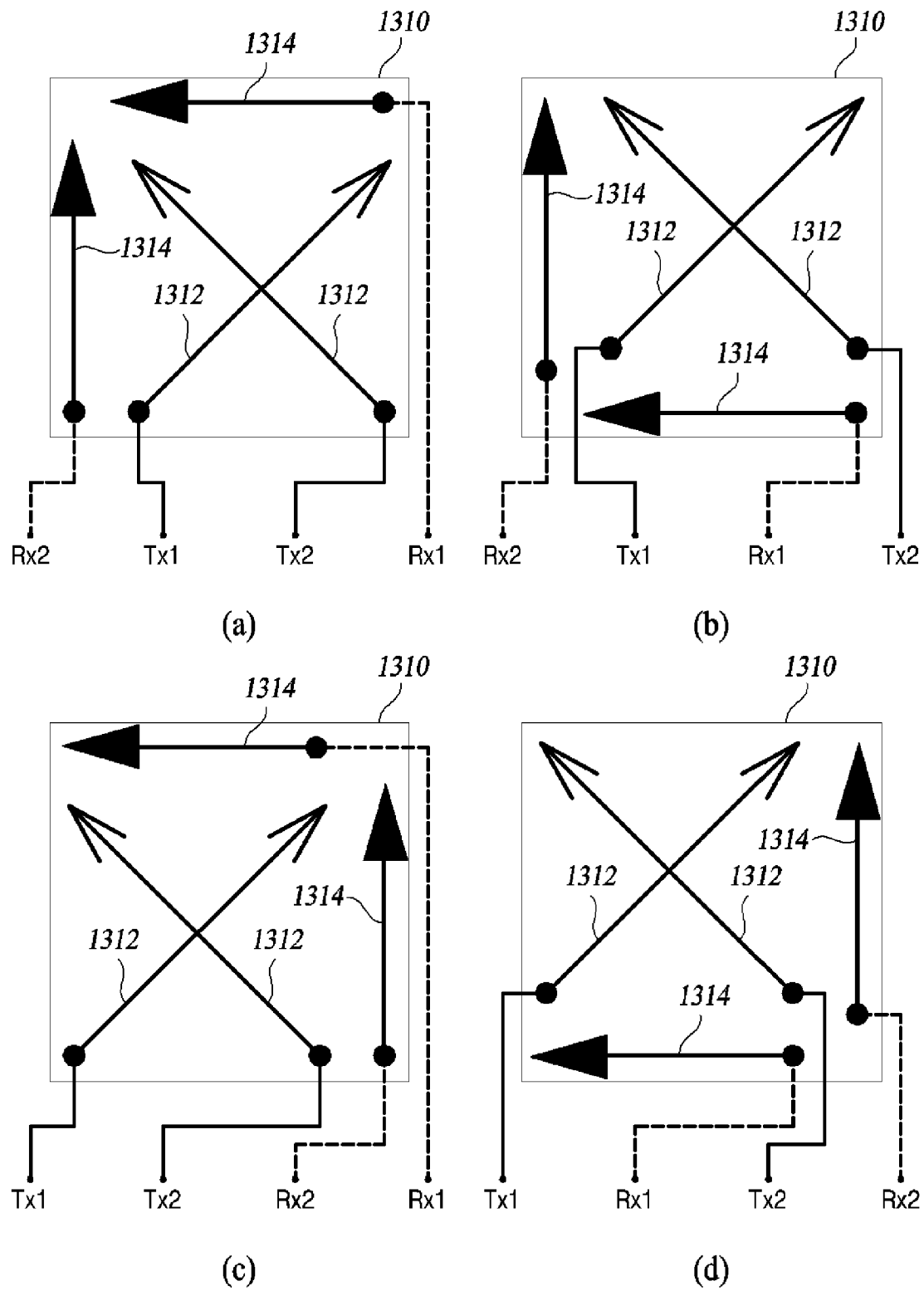

Referring to FIG. 3B, a pair of radiators constituting the reception antenna element 1314 may be (i) disposed adjacent to a left side and an upper side of the transmission antenna element 1312 (see (a) of FIG. 3B), (ii) disposed adjacent to the left side and a lower side of the transmission antenna element 1312 (see (b) of FIG. 3B), (iii) disposed adjacent to the right side and the upper side of the transmission antenna element 1312 (see (c) of FIG. 3B), or (iv) disposed adjacent to the right side and the lower side of the transmission antenna element 1312 (see (d) of FIG. 3B).

Figure 3C:
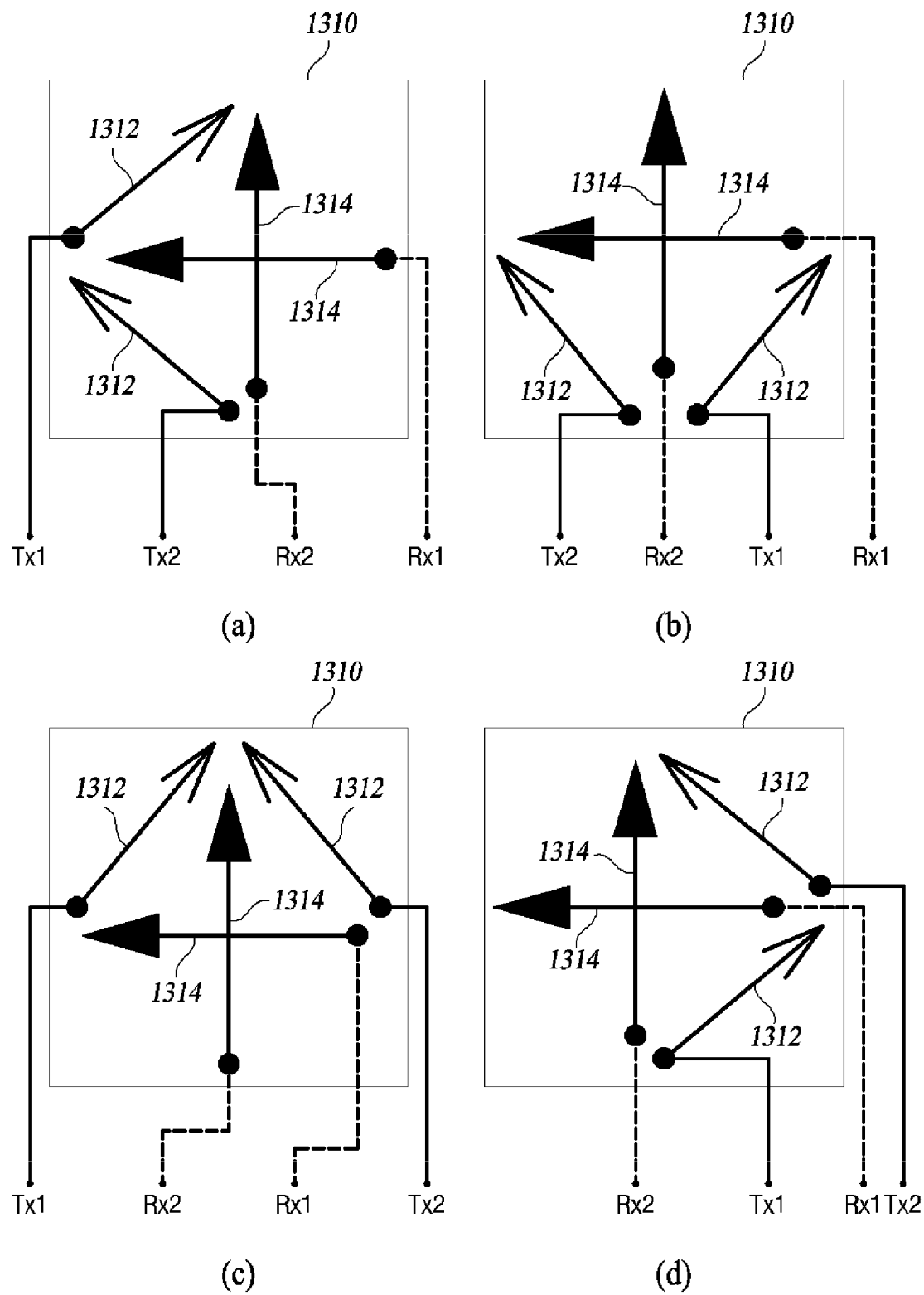

Referring to FIG. 3C, a pair of radiators constituting the transmission antenna element 1312 may be (i) disposed adjacent to a top left side and a bottom left side of the reception antenna element 1314 (see (a) of FIG. 3C), (ii) disposed adjacent to the bottom left side and a bottom right side of the reception antenna element 1314 (see (b) of FIG. 3C), (iii) disposed adjacent to the top left side and a top right side of the reception antenna element 1314 (see (c) of FIG. 3C), or (iv) disposed adjacent to the top right side and the bottom right side of the reception antenna element 1314 (see (d) of FIG. 3C).

As such, any one antenna element 1312 or 1314 is disposed adjacent to a side surface of the other one antenna element 1314 or 1312, the antenna module 1310 illustrated in FIGS. 3B and 3C may provide more enhanced area efficiency than the antenna module 1310. Further, the enhancement of the area efficiency may lead to convenience of manufacturing, installation, maintenance, etc.

Figure 3D:
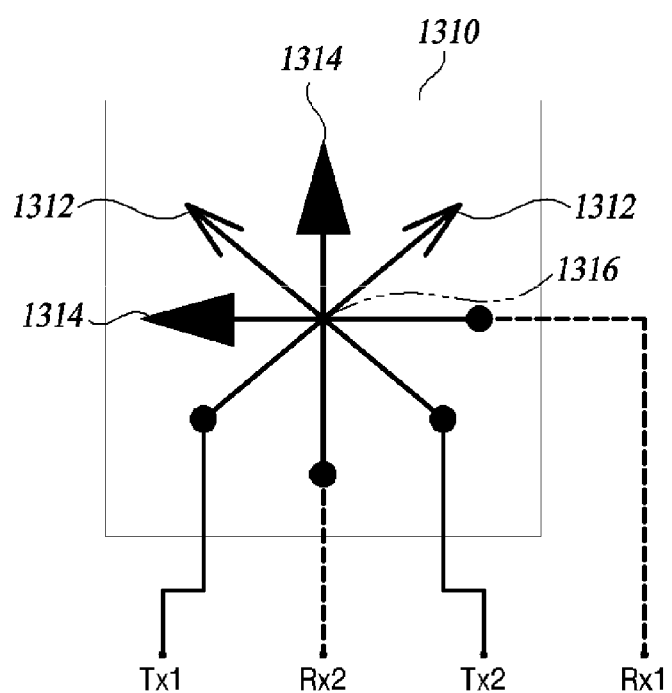

In the antenna module 1310 illustrated in FIG. 3D, two radiators constituting the transmission antenna element 1312 and the radiators constituting the reception antenna element 1314 cross each other at one intersection 1316, and therefore, the area efficiency of an array of FIG. 3D is maximized as compared with arrays of FIG. 3A to FIG. 3C.

Moreover, in the above description described with reference to FIG. 3A to FIG. 3D, it should be appreciated that a location of the transmission antenna element 1312 and a location of the reception antenna element 1314 may be reversed.

Polarization Composition and Polarization Allocation

Figure 4:
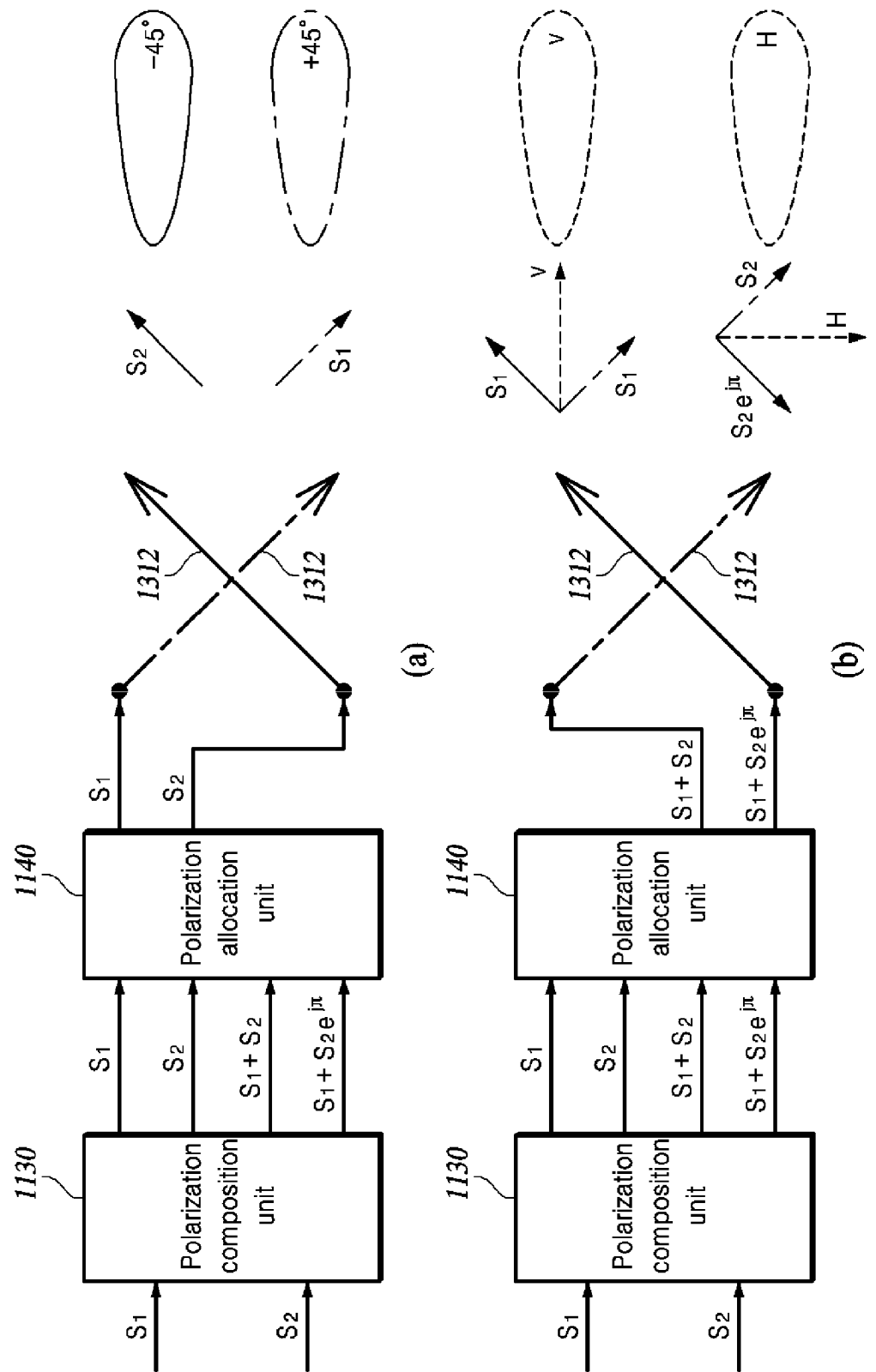
FIG. 4 is a conceptual view for describing polarization composition and polarization allocation performed in relation to one transmission antenna element according to an embodiment of the present disclosure.
Figure 5:
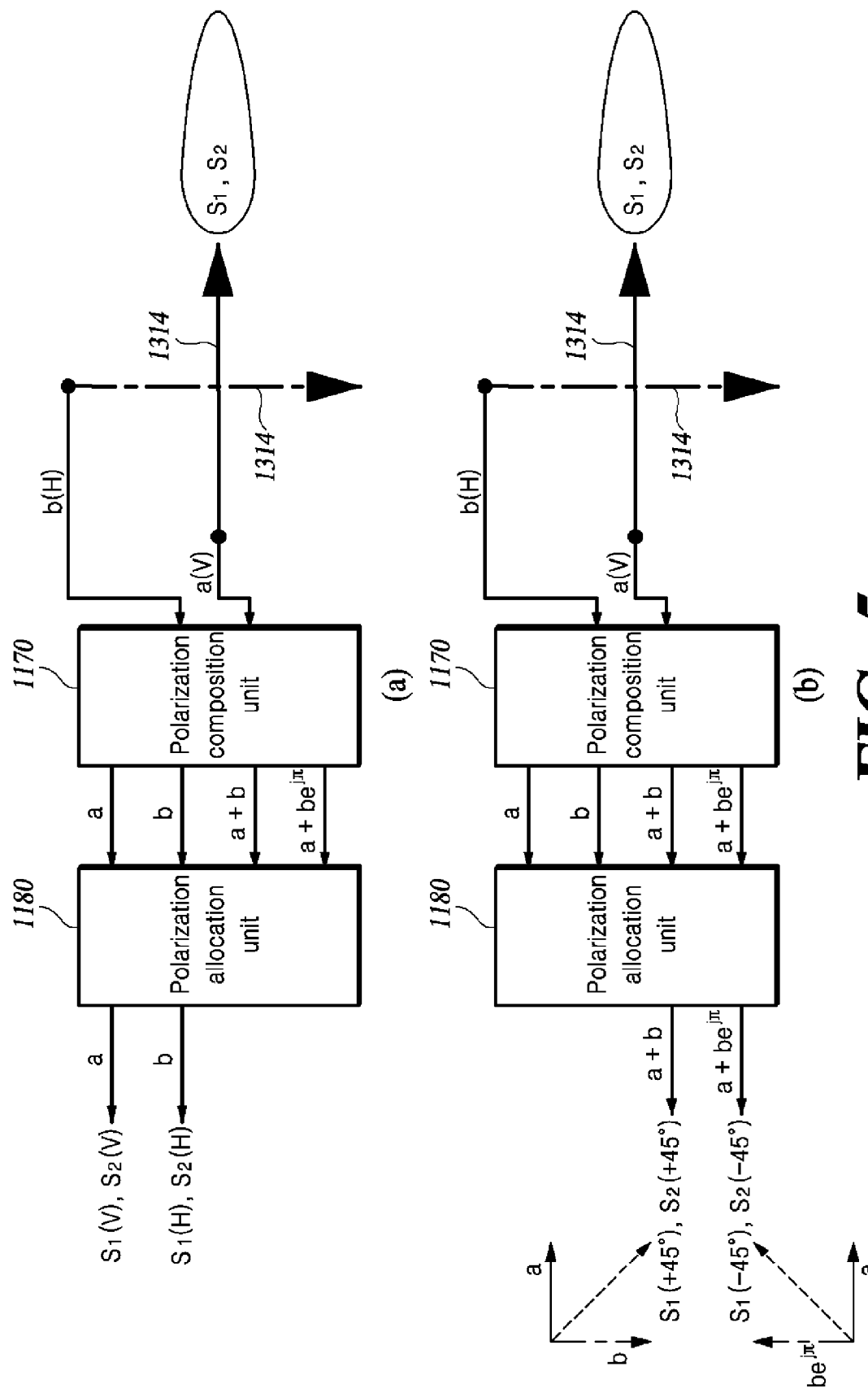
FIG. 5 is a conceptual view for describing polarization composition and polarization allocation performed in relation to one reception antenna element according to an embodiment of the present disclosure.

FIG. 4 is a conceptual view for describing polarization composition and polarization allocation performed in relation to one transmission antenna element according to an embodiment of the present disclosure, and FIG. 5 is a conceptual view for describing polarization composition and polarization allocation performed in relation to one reception antenna element according to an embodiment of the present disclosure.

As described above, the transmission polarization composition unit 1130 may compose and output four different polarization components from two transmission signals to be transmitted through one transmission antenna element 1312.

Referring to FIG. 4, the transmission polarization composition unit 1130 may compose and output different polarization components "S1", "S2", "S1+S2", and "S1+S2$e^{j\pi}$" from transmission signals S1 and S2. Here, "S1" and "S2" are used for generating beams having the same polarization orientation as the polarization characteristics of the transmission antenna element 1312, and "S1+S2" and "S1+S2$e^{j\pi}$" are used for generating beams having different polarization orientations from the polarization characteristics of the transmission antenna element 1312.

The composition of the polarization components performed by the transmission polarization composition unit 1130 may be implemented through a matrix operation of Equation 1 below.

$$\begin{bmatrix} 1 & 0 \\ 0 & 1 \\ 1 & 1 \\ 1 & e^{j\pi} \end{bmatrix} \begin{bmatrix} S_1 \\ S_2 \end{bmatrix} = \begin{bmatrix} S_1 \\ S_2 \\ S_1 + S_2 \\ S_1 + S_2 e^{j\pi} \end{bmatrix} \quad \text{[Equation 1]}$$

In Equation 1 above, $$\begin{bmatrix} 1 & 0 \\ 0 & 1 \\ 1 & 1 \\ 1 & e^{j\pi} \end{bmatrix}$$

represents a polarization vector composition-decomposition (PVCD) matrix. Here, in order to prevent powers of third and fourth polarization components "S1+S2" and "S1+s2$e^{j\pi}$", a scale coefficient may be applied to elements in a third row and elements in a fourth row. The scale coefficient may be $1/\sqrt{2}$.

The transmission polarization allocation unit 1140 may output two polarization components to be radiated through two radiators of the transmission antenna element 1312 among four polarization components of the transmission signals S1 and S2 output from the transmission polarization composition unit 1130 to two transmission paths.

For example, the transmission polarization allocation unit 1140 may (i) output "S1" and "S2" (see (a) of FIG. 4) or (ii) output "S1+S2" and "S1+S2$e^{j\pi}$" (see (b) of FIG. 4) among four polarization components "S1", "S2", "S1+S2", and "S1+s2$e^{j\pi}$".

According to the polarization components output from the transmission polarization allocation unit 1140, beams radiated from the transmission antenna element 1312 having the ±45° orthogonal polarization characteristics may have the ±45° orthogonal polarization or the V/H orthogonal polarization.

As in (a) of FIG. 4, when the polarization components "S1" and "S2" are allocated to the transmission channels, the polarization component "S1" radiated through the radiator having the +45° polarization characteristics forms a beam pattern having +45° polarization and the polarization component "S1" radiated through the radiator having the −45° polarization characteristics forms a beam pattern having −45° polarization. That is, the transmission antenna element 1312 having the ±45° orthogonal polarization characteristics forms a beam pattern having the ±45° orthogonal polarization.

As in (b) of FIG. 4, when the polarization components "S1+S2" and "S1+s2$e^{j\pi}$" are allocated to the transmission channels, a polarization composition occurs between the beam formed by the polarization component "S1+S2" radiated through the radiator having the +45° polarization characteristics and the beam formed by the polarization component "S1 +S2$e^{j\pi}$" radiated through the radiator having the −45° polarization characteristics.

Specifically, in the case of the polarization component "S1", a first beam radiated through the radiator having the +45° polarization characteristics has a +45° polarization orientation and a second beam radiated through the radiator having the −45° polarization characteristics has a −45° polarization orientation, and as a result, the first beam and the second beam are composed, so a composition beam having a V polarization orientation appears. In the case of the polarization component "S2", a third beam radiated through the radiator having the +45° polarization characteristics has the +45° polarization orientation and a fourth beam radiated through the radiator having the −45° polarization characteristics has a "−45°+π" polarization orientation, and as a result, the third beam and the fourth beam are composed, so a composition beam having the V polarization orientation appears.

Meanwhile, when the reception antenna element 1314 receives the radio signals S1 and S2 in the free space, orthogonal polarization orientations of reception signals a and b are determined by the orthogonal polarization characteristics of the reception antenna element 1314. For example, when the dual polarization characteristics of the reception antenna element 1314 are the V/H orthogonal polarization, the reception signals have the V/H orthogonal polarization.

Referring to FIG. 5, with respect to the radio signals S1 and S2, the reception signal a captured by the radiator having the V polarization of the reception antenna element 1314 includes an S1 signal component S1(V) of the V polarization and an S2 signal component S2(V) of the V polarization, and the reception signal b captured by the radiator having the H polarization includes an S1 signal component S1(H) of the H polarization and an S2 signal component S2(H) of the H polarization.

As described above, the reception polarization composition unit 1170 may compose and output four different polarization components from two reception signals a and b by received by one reception antenna element 1314. The composition of the polarization components performed by the reception polarization composition unit 1170 may be implemented through the matrix operation of Equation 1.

As illustrated in FIG. 5, the reception polarization composition unit 1170 may compose and output different polarization components "a", "b", "a+b", and "a+b$e^{j\pi}$" from the reception signals a and b for the RF signals S1 and S2. Here, "a" and "b" are polarization components having the same polarization orientation as the polarization characteristics of the reception antenna element 1314, and "a+b" and "a+b$e^{j\pi}$" are polarization components having different polarization orientations from the polarization characteristics of the reception antenna element 1314.

Specifically, the polarization component "a" has the S1 signal component S1(V) of the V polarization and the S2 signal component S2(V) of the V polarization, and the polarization component "b" has the S1 signal component S1(H) of the H polarization and the S2 signal component S2(H) of the H polarization.

Further, the polarization component "a+b" has (i) a+45°-polarization S1 signal component S1(+45°) in which the S1 signal component S1(V) of the V polarization and the S1 signal component S1(H) of the H polarization are composed and (ii) a+45°-polarization S2signal component S2(+45°) in which the S2 signal component S2(V) of the V polarization and the S2 signal component S2(H) of the H polarization are composed.

Further, the polarization component "a+b$e^{j\pi}$" has (i) a −45°-polarization S1 signal component S1(−45°) in which the S1 signal component S1(V) of the V polarization and the S1 signal component S1(H+π) of H+π polarization are composed and (ii) a −45°-polarization S2 signal component S2(−45°) in which the S2 signal component S2(V) of the V polarization and the S2 signal component S2(H+π) of the H+π polarization are composed.

The reception polarization allocation unit 1180 may output two polarization components among the polarization components of the reception signals a and b output from the reception polarization composition unit 1170 to two reception paths. For example, the transmission polarization allocation unit 1180 may (i) output "a" and "b" (see (a) of FIG. 5) or (ii) output "a +b" and "a +b$e^{j\pi}$" (see (b) of FIG. 5) among four polarization components "a", "b", "a+b", and "a+b$e^{j\pi}$".

As in (a) of FIG. 5, when the polarization components "a" and "b" are allocated to the reception channels, the signal components "S1(V) and S2(V)" and "S1(H) and S2(H)" of the same orthogonal polarization as the orthogonal polarization characteristics of the reception antenna element 1314 are output to the reception channels, with respect to the RF signals S1 and S1.

As in (b) of FIG. 5, when the polarization components "a+b" and "a+b$e^{j\pi}$" are allocated to the reception channels, the signal components "S1(+45°) and S2(+45°)" and "S1(−45°) and S2(−45°)" of the composed orthogonal polarization different from the orthogonal polarization characteristics of the reception antenna element 1314 are output to the reception channels, with respect to the RF signals S1 and S1.

FIGS. 2A to 2D illustrate that the antenna apparatus 10 includes one transmission polarization composition unit 1130 and one transmission polarization allocation unit 1140, which integratedly perform polarization composition and polarization allocation with respect to all transmission signals or transmission channels.

However, in another embodiment, the antenna apparatus 10 may also be configured to include a plurality of transmission polarization composition units and a plurality of transmission polarization allocation units which perform the polarization composition and the polarization allocation with respect to the transmission signals or the transmission channels related to respective transmission beams. Similarly, the antenna apparatus 10 may also be configured to include a plurality of reception polarization composition units and a plurality of reception polarization allocation units. An example of such a configuration is illustrated in FIG. 6.

Figure 6:
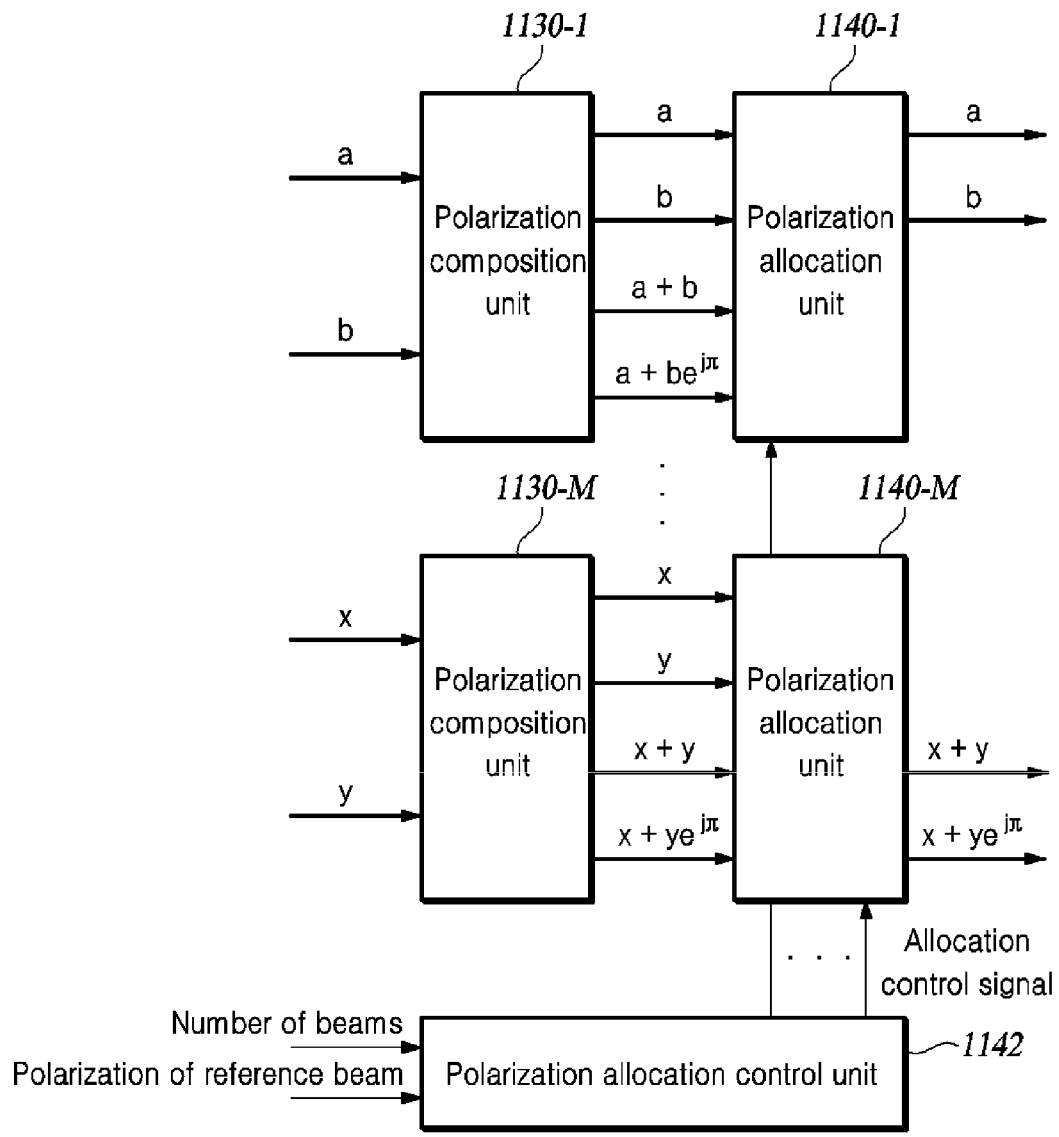
FIG. 6 is a block diagram illustrating an exemplary structure for performing polarization composition and polarization allocation for transmission signals in the antenna apparatus according to an embodiment of the present disclosure.

FIG. 6 is a block diagram illustrating an exemplary structure for performing polarization composition and polarization allocation for transmission signals in the antenna apparatus according to an embodiment of the present disclosure.

Referring to FIG. 6, the antenna apparatus may be configured to include a plurality of polarization composition units 1130-1 to 1130-M, a plurality of polarization allocation units 1140-1 to 1140-M, and a polarization allocation control unit 1142. The polarization allocation control unit 1142 integratedly manages the polarization allocation of the transmission signals performed by the plurality of transmission polarization composition units 1130-1 to 1130-M.

The polarization allocation control unit 1142 may determine the orthogonal polarizations for the respective transmission channels based on the number of beams and an orthogonal polarization of a reference beam. Here, the number of beams may mean the number of beams to be generated by using the array antenna 130, and the reference beam may be any one beam (for example, a transmission beam related to a first transmission channel and a second transmission channel among M transmission channels) predefined among multiple beams. The polarization allocation control unit 1142 may determine the orthogonal polarizations for the respective transmission channels so that transmission beams neighboring to each other among multiple transmission beams have different orthogonal polarizations.

The polarization allocation control unit 1142 may generate allocation control signals for controlling allocation of the orthogonal polarizations to the transmission channels. The polarization allocation control unit 1142 may transmit the allocation control signals the polarization allocation units 1140-1 to 1140-M. The respective polarization allocation units 1140-1 to 1140-M may output polarization components corresponding to the orthogonal polarizations indicated by the allocation control signal among four polarization components generated by the corresponding polarization composition units 1130-1 to 1130-M.

The polarization components output by the respective polarization allocation units 1140-1 to 1140-M are supplied to corresponding transmission antenna elements 1312 via subsequent components. The transmission signals to which the orthogonal polarizations are allocated may be radiated to beams of different orientations in the free space through the transmission antenna elements 1312. The spatial polarization separation may be configured by at least one direction of the horizontal direction and the vertical direction.

Figure 7:
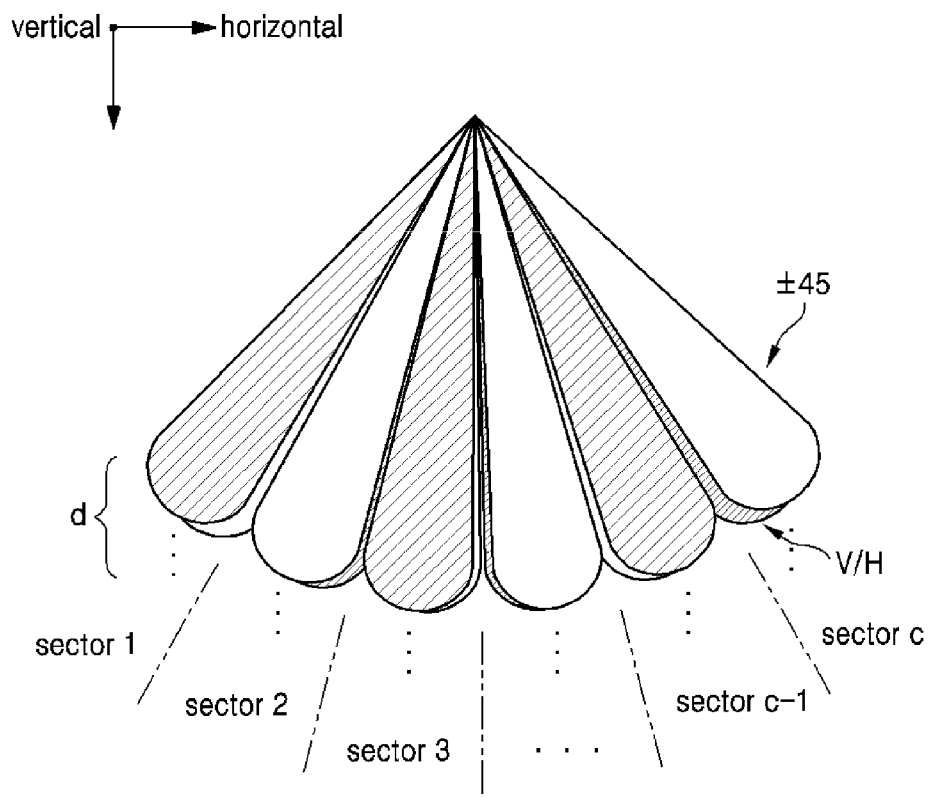
FIG. 7 is a conceptual view for describing spatial polarization separation in a horizontal direction and a vertical direction provided by the antenna apparatus according to an embodiment of the present disclosure.

FIG. 7 is a conceptual view for describing spatial polarization separation in a horizontal direction and a vertical direction provided by the antenna apparatus according to an embodiment of the present disclosure.

As illustrated in FIG. 7, the antenna apparatus 10 may form c beams separated in the horizontal direction to correspond to c sectors by using the array antenna 130, and form d beams separated in the vertical direction for each of c sectors. That is, the antenna apparatus 10 may provide 3D beamforming. The numbers of spatially separated beams in the vertical direction for respective sectors may also be the same as or different from each other. Therefore, a coverage area of the antenna apparatus 10 may be divided into up to c×d subsectors.

With respect to the beams separated in the horizontal direction, contiguous beams have different orthogonal polarizations (that is, spatial polarization separation in the horizontal direction), and as a result, a correlation between horizontally contiguous beams may be sufficiently small. Further, in each sector, with respect to the beams separated in the vertical direction, the contiguous beams may have different orthogonal polarizations (that is, the spatial polarization separation in the vertical direction), and a correlation between vertically contiguous beams may be sufficiently small. Furthermore, beams (for example, a first beam of a first sector and a second beam of a second sector) having the same orthogonal polarization between contiguous sectors are sufficiently spaced in the horizontal direction and in the vertical direction, so a correlation between two beams may also be sufficiently small.

Previously, it is noted that the antenna apparatus using two kinds of orthogonal polarizations jointly is not attempted due to a high correlation between the ±45° orthogonal polarization and the H/V orthogonal polarization. The antenna apparatus 10 according to the present disclosure allocates different orthogonal polarizations between spatially contiguous beams to improve the correlation between the orthogonal polarizations, thereby implementing polarization reuse capable of perfectly using efficiency of a polarization diversity provided by two kinds of orthogonal polarizations (that is, four different polarizations). The term "polarization reuse" is based on frequency reuse.

Figure 8:
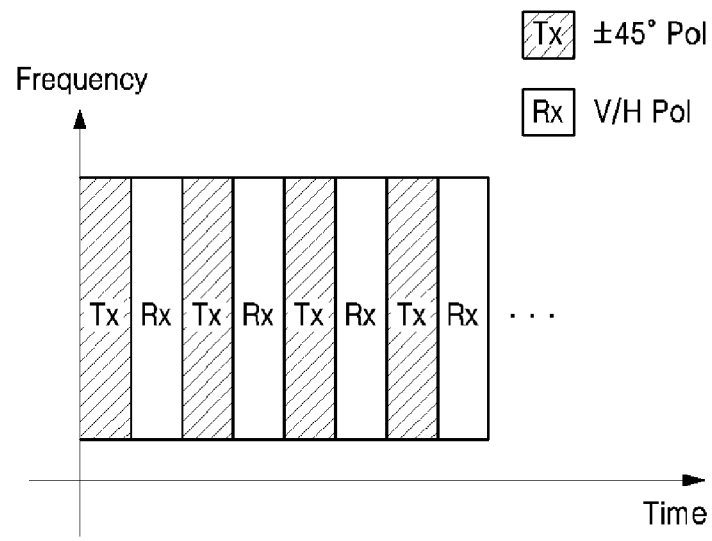
FIG. 8 is a conceptual view for describing temporal polarization separation provided by the antenna apparatus according to an embodiment of the present disclosure.

FIG. 8 is a conceptual view for describing temporal polarization separation provided by the antenna apparatus according to an embodiment of the present disclosure.

The antenna apparatus 10 according to the present disclosure allocates two kinds of orthogonal polarizations to the transmission channel and the reception channel so that the transmission beam and the reception beam formed in the same direction have different orthogonal polarizations to temporally separate two kinds of orthogonal polarizations.

In FIG. 8, an area Tx marked with a hatched line represents a time interval in which the signal is transmitted through the transmission antenna element 1312, and an area Rx not marked with the hatched line represents a time interval in which the signal is received through the reception antenna element 1314.

In the example of FIG. 8, the orthogonal polarization is used during a transmission time interval, and the vertical/horizontal orthogonal polarization is used during a reception time interval, so different orthogonal polarizations are temporally separated and used. Contrary to the example, it should be appreciated that the ±45° orthogonal polarization may be used during the reception time interval, and the vertical/horizontal orthogonal polarization is used during the transmission time interval.

In particular, in the antenna apparatus 10 according to the present disclosure, orthogonal polarization characteristics of the transmission antenna element and the reception antenna element used for a TDD operation may also be different from each other, and as a result, orthogonal polarizations used for transmission of the signal and reception of the signal may be different from each other.

Channel Non-Reciprocity Correction

Channel reciprocity is a premise that channel characteristics of a downlink channel and an uplink channel are the same as each other in the same frequency band. That is, the channel reciprocity means a property that the downlink channel and the uplink channel have similar characteristics to each other.

When the channel reciprocity is used, it is possible to for the base station to estimate a downlink channel response by using an uplink channel response or estimate the uplink channel response by using the downlink channel response. Therefore, the channel reciprocity may be a largest advantage which a time division duplexing (TDD) scheme as compared with a frequency division duplexing (FDD) scheme.

Figure 9:
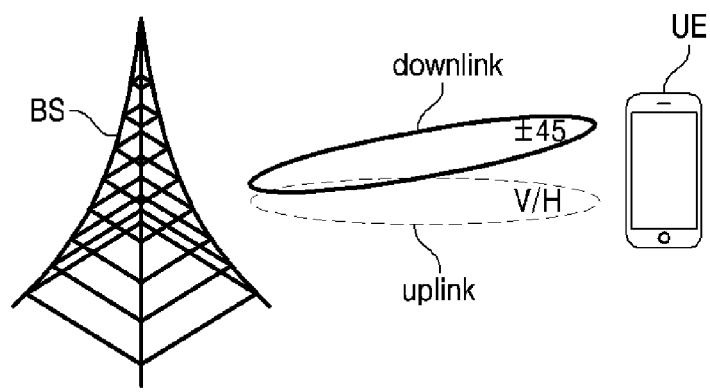
FIG. 9 is a conceptual view for describing a channel non-reciprocity problem which may occur when different dual polarized waves are used between transmission of a signal and reception of the signal.

FIG. 9 is a conceptual view for describing a channel non-reciprocity problem which may occur when the antenna apparatus uses different dual polarized waves between transmission of a signal and reception of the signal.

As described above, the antenna apparatus according to the present disclosure uses the spatial polarization separation and the temporal polarization separation. Therefore, the orthogonal polarization of the transmission beam formed in a certain spatial direction may be different from the orthogonal polarization characteristics of the reception antenna element used for receiving the radio signal from the certain spatial direction. For example, in a certain spatial direction, the transmission beam may have the ±45° orthogonal polarization and the reception antenna element may have the H/V orthogonal polarization characteristics. As another example, the transmission beam may have the H/V orthogonal polarization, and the reception antenna element may have the ±45° orthogonal polarization characteristics. As such, when different orthogonal polarizations are used in the downlink and the uplink, the radio channel characteristics between the uplink and the downlink are different, and as a result, the channel reciprocity between the downlink and the uplink is not established. That is, the channel non-reciprocity occurs.

Non-establishment of the channel reciprocity (that is, the occurrence of the channel non-reciprocity) is not an issue when the beamforming is not performed or when beamforming based on a channel state information-reference signal (CSI-RS), which the gNB transmits to the UE in 5G NR, is performed. However, when beamforming based on a sounding reference signal (SRS) is performed, the non-establishment of channel reciprocity may deteriorate the performance of the antenna apparatus.

The SRS is an uplink reference signal which the UE transmits the gNB to estimate the state of the uplink channel, and the UE aperiodically transmits the SRS to the gNB to announce state information of the uplink channel. The gNB may estimate channel state information (CSI) of the uplink channel based on the received SRS, and determine downlink beamforming based on the estimated CSI.

Therefore, if the channel reciprocity is not established, the performance of the antenna apparatus may be deteriorated when the weight vector acquired based on the SRS is used in the downlink teamforming.

In order to solve the problem, the antenna apparatus according to the embodiments of the present disclosure matches the orthogonal polarization of the reception signals with the orthogonal polarization of the transmission channels (or transmission beam) through signal processing of the reception signals to correct the channel non-reciprocity (that is, acquire or retain the channel reciprocity).

As described above, the correction of the channel non-reciprocity may be achieved by the polarization conversion of the polarization conversion unit 1160, alternatively, by the polarization composition and the polarization allocation of the polarization composition unit 1170 and the polarization allocation unit 1180. Hereinafter, exemplary structures for correcting the channel non-reciprocity and an operation thereof will be described with reference to FIG. 10A, FIG. 10B, FIG. 11A and FIG. 11B.

Figure 10A:
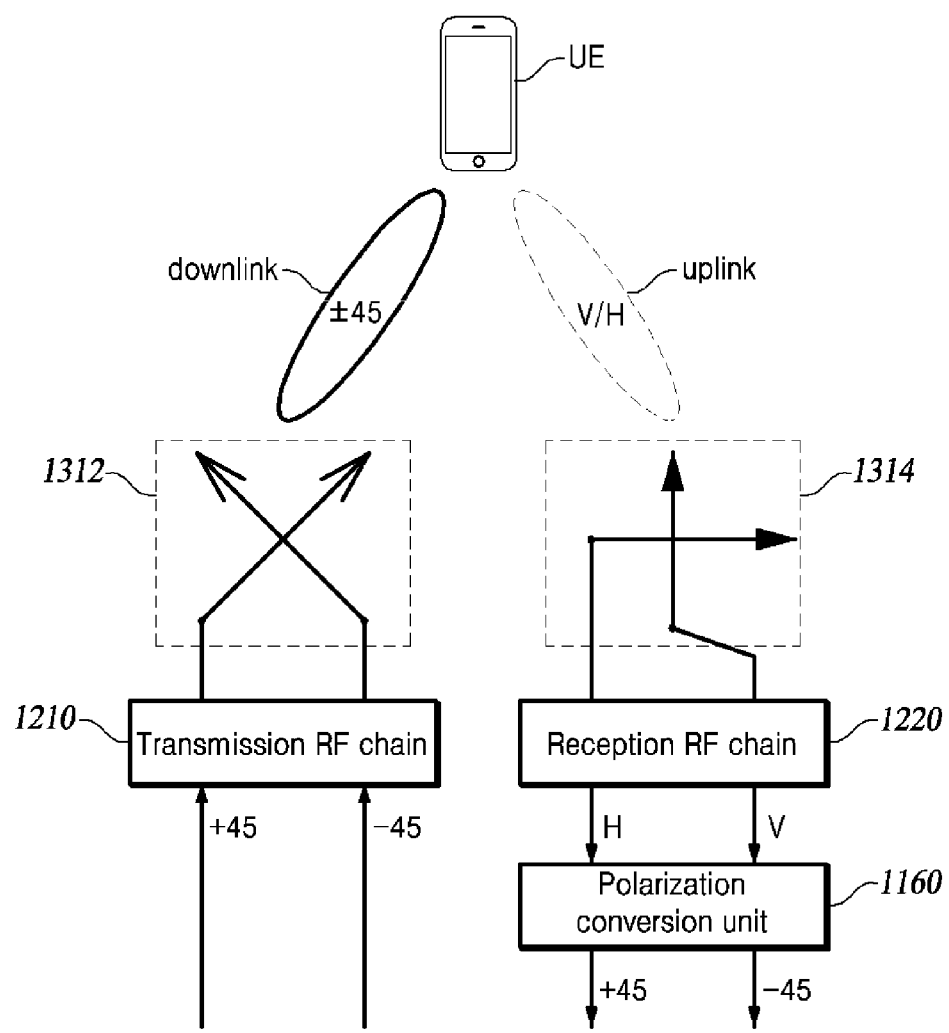
FIG. 10A and FIG. 10B are conceptual views for describing a method for correcting a channel non-reciprocity by using polarization conversion according to an embodiment of the present disclosure.
Figure 10B:
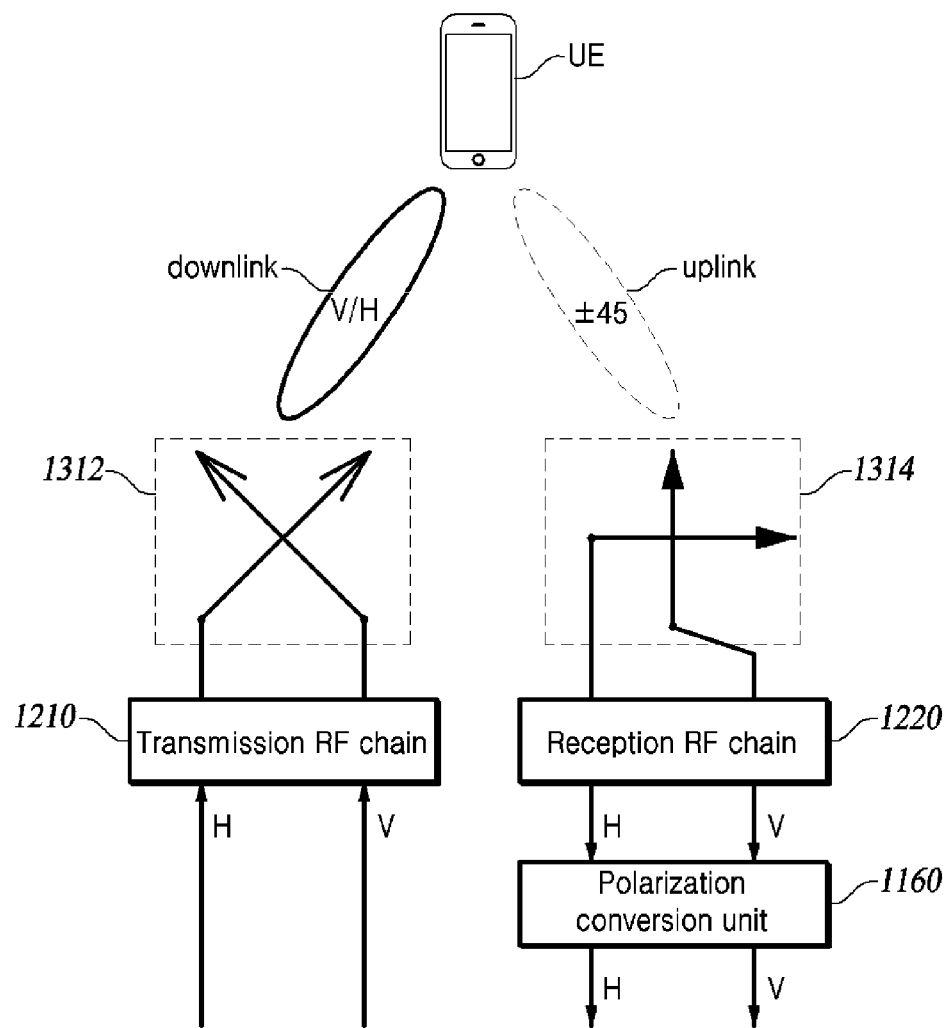

The exemplary structure of FIGS. 10A and 10B includes the polarization conversion unit 1160 which is configured to preform the function of correcting the channel non-reciprocity.

In the example of FIG. 10A, the orthogonal polarization characteristics (V/H) of the reception antenna element 1314 are different from the orthogonal polarization)(±45° of the radio wave (or transmission beam) of the downlink channel, so the channel non-reciprocity correction is required.

Referring to FIG. 10A, two digital transmission signals to which the ±45° orthogonal polarization is allocated are subjected to the RF signal processing of the RF chain 1210 and fed to the transmission antenna element 1312. When the polarization components corresponding to the ±45° orthogonal polarization are input into the transmission RF chain, the transmission antenna element 1312 has the ±45° orthogonal polarization characteristics, so the radio wave of the downlink channel has the ±45° orthogonal polarization. The reception antenna element 1314 receives the radio wave of the uplink channel and outputs an analog reception signal. The reception antenna element 1314 has the V/H orthogonal polarization characteristics, so the analog reception signal corresponds to the V/H orthogonal polarization component of the radio wave. The analog reception signals are subjected to the RF signal processing of the reception RF chain 1220, and converted into digital reception signals.

The polarization conversion unit 1160 performs the polarization conversion for the digital reception signals to output polarization converted signals having the same orthogonal polarization as the orthogonal polarization of the downlink channel. The polarization conversion performed by the polarization conversion unit 1160 may be implemented through the matrix operation of Equation 2 below.

$$\begin{pmatrix} 1 & 1 \\ 1 & e^{j\pi} \end{pmatrix} \begin{pmatrix} a \\ b \end{pmatrix} = \begin{pmatrix} a+b \\ a+be^{j\pi} \end{pmatrix} \quad \text{[Equation 2]}$$

In Equation 2, a and b are the digital reception signals input into the polarization conversion unit 1160, and a+b and a+be$^{j\pi}$ are the polarization converted reception signals output from the polarization conversion unit 1160. Furthermore, $$\begin{pmatrix} 1 & 1 \\ 1 & e^{j\pi} \end{pmatrix}$$

represents a polarization decomposition (PD) matrix for the conversion of the orthogonal polarization. However, in order to avoid the power of the polarization converted reception signal from being increased, the scale coefficient may be applied to all elements in the PD matrix. The scale coefficient may be $1/\sqrt{2}$.

In the example of FIG. 10B, since the orthogonal polarization characteristics (V/H) of the reception antenna element 1314 coincide with the orthogonal polarization (V/H) of the radio wave (or transmission beam) of the downlink channel, the channel non-reciprocity correction is not required. Therefore, the polarization conversion unit 1160 outputs the input digital reception signals as they are without the polarization conversion.

Figure 11A:
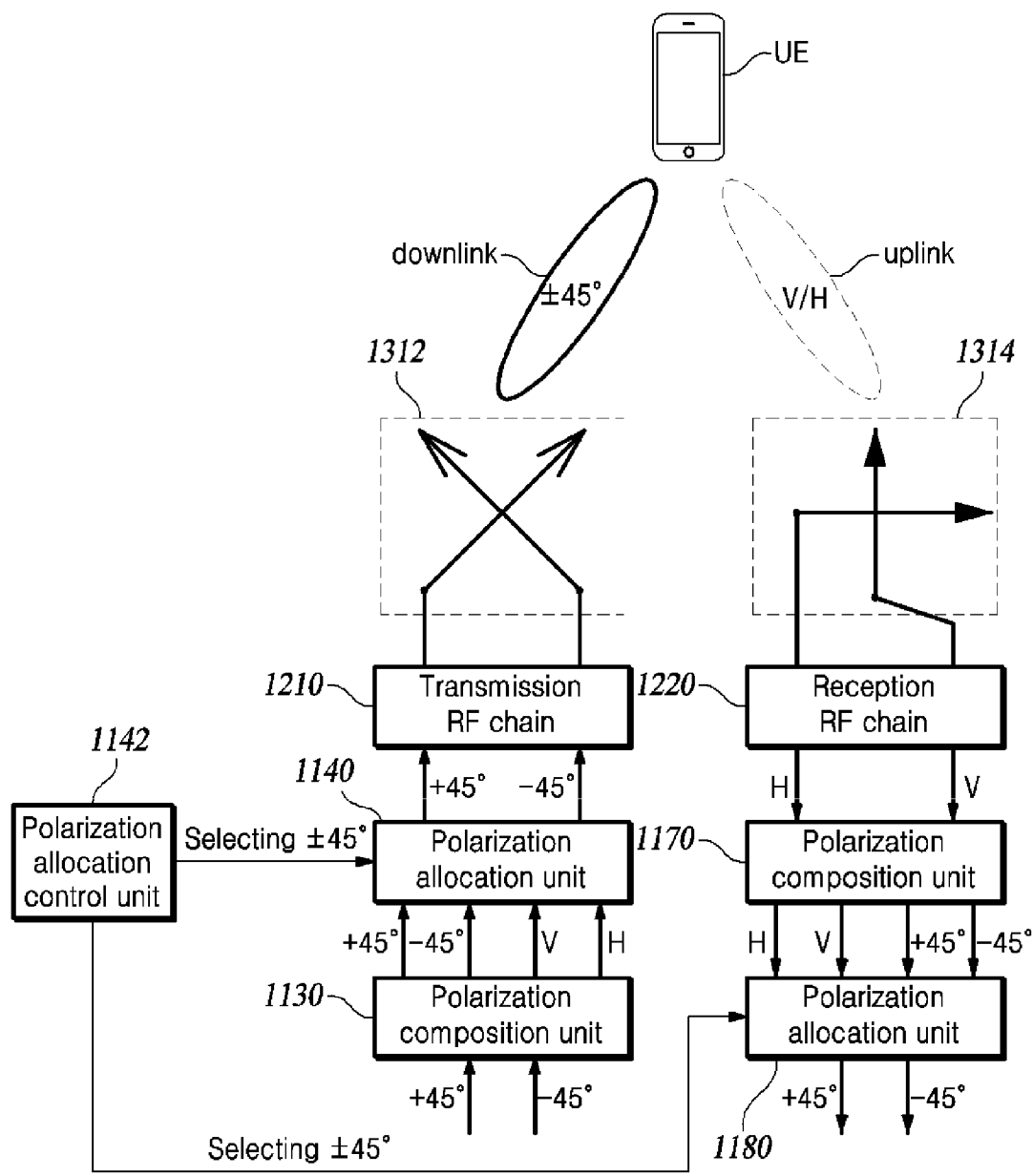
FIG. 11A and FIG. 11B are conceptual views for describing a method for correcting a channel non-reciprocity by using polarization composition and polarization allocation according to an embodiment of the present disclosure.
Figure 11B:
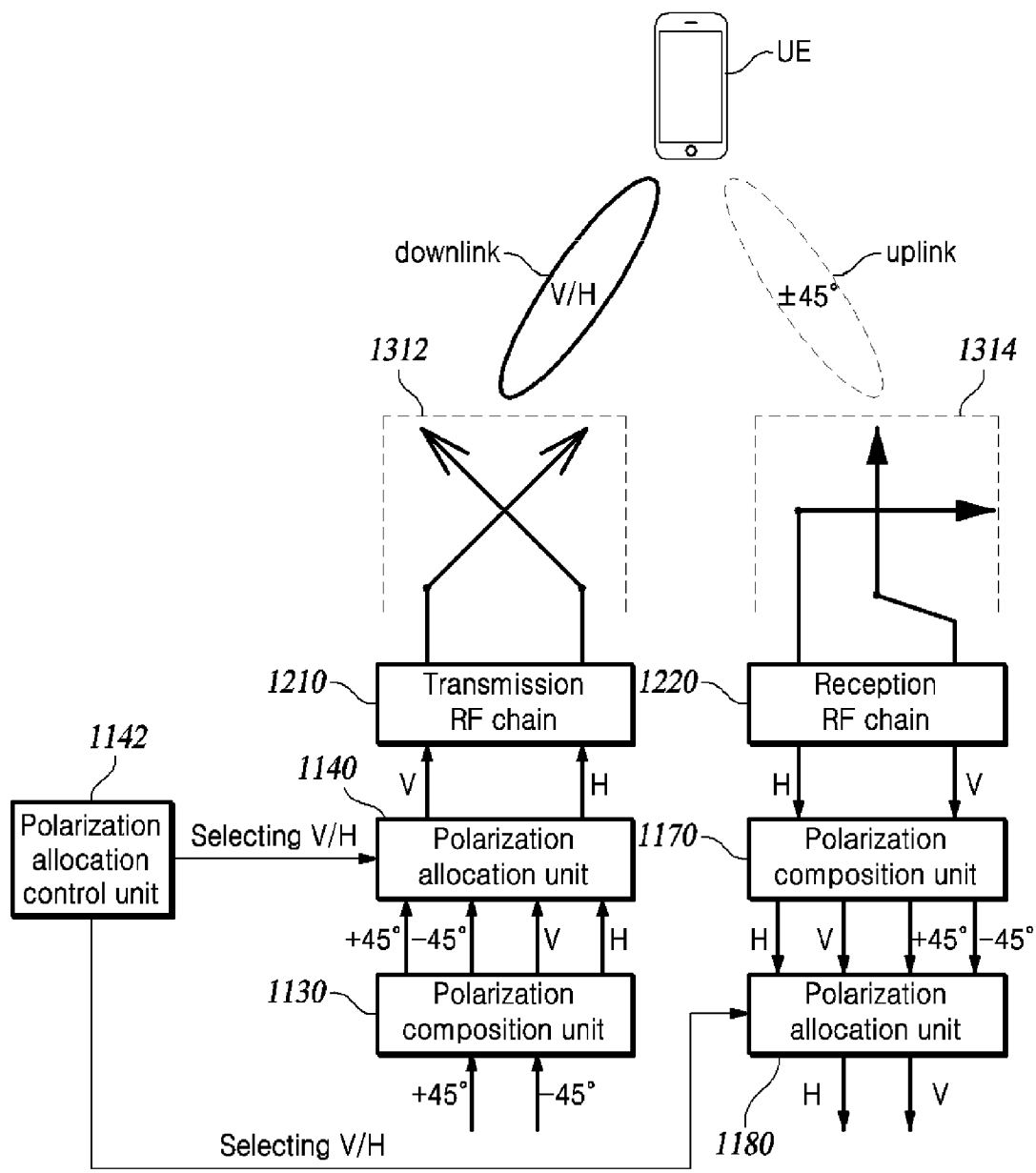

In the exemplary structures of FIGS. 11A and 11B, the function of correcting the channel non-reciprocity is implemented by the polarization allocation control unit 1142, the reception polarization composition unit 1170, and the reception polarization allocation unit 1180.

In the example of FIG. 11A, since the orthogonal polarization characteristics (V/H) of the reception antenna element 1314 are different from the orthogonal polarization) (±45°) of the radio wave (or transmission beam) of the downlink channel, the channel non-reciprocity correction is required. Therefore, the orthogonal polarization of the signals input into the reception polarization composition unit 1170 is different from those of the signal output from the reception polarization allocation unit 1180.

Referring to FIG. 11A, the reception polarization composition unit 1170 generates four polarization components for a pair of transmission signals, and the reception polarization allocation unit 1140 outputs two polarization components corresponding to the ±45° orthogonal polarization in response to the control signal of the polarization allocation control unit 1142. The two polarization components are fed to the transmission antenna element 1312 via the transmission RF chain 1210. The transmission antenna element 1312 has the ±45° orthogonal polarization characteristics, so the radio wave (or transmission beam) of the downlink channel has the ±45° orthogonal polarization.

The reception antenna element 1314 receives the radio wave of the uplink channel and outputs two analog reception signals. The reception antenna element 1314 has the V/H orthogonal polarization characteristics, so two analog reception signals correspond to the V/H orthogonal polarization component of the radio wave. The two analog reception signals are subjected to the RF signal processing of the reception RF chain 1220, and converted into two digital reception signals. The reception polarization composition unit 1170 may compose four orthogonal polarization components from the two digital reception signals.

In order to correct the channel non-reciprocity, the polarization allocation control unit 1142 selects the same orthogonal polarization (i.e., ±45° orthogonal polarization) as the orthogonal polarization selected for the transmission polarization allocation unit 1140, and transmits an allocation control signal indicating the selected orthogonal polarization to the reception polarization allocation unit 1180. The reception polarization allocation unit 1180 outputs two polarization components corresponding to the orthogonal polarization (i.e., ±45° orthogonal polarization) indicated by the allocation control signal among the four orthogonal polarization components.

In the example of FIG. 11B, since the orthogonal polarization characteristics (V/H) of the reception antenna element 1314 coincide with the orthogonal polarization (V/H) of the radio wave (or transmission beam) of the downlink channel, the channel non-reciprocity correction is not required. Therefore, the orthogonal polarization of the signals input into the reception polarization composition unit 1170 is not different from those of the signals output from the reception polarization allocation unit 1314.

Referring to FIG. 11B, the reception polarization allocation unit 1140 outputs two polarization components corresponding to the V/H orthogonal polarization in response to the control signal of the polarization allocation control unit 1142. The polarization components are fed to the transmission antenna element 1312 via the transmission RF chain 1210. The transmission antenna element 1312 has the ±45° orthogonal polarization characteristics, so the radio wave (or transmission beam) of the downlink channel has the V/H orthogonal polarization by the polarization composition.

The reception antenna element 1314 receives the radio wave of the uplink channel and outputs two analog reception signals. The reception antenna element 1314 has the V/H orthogonal polarization characteristics, so two analog reception signals correspond to the V/H orthogonal polarization component of the radio wave. Two analog reception signals are subjected to the RF signal processing of the reception RF chain 1220, and converted into two digital reception signals. The reception polarization composition unit 1170 may compose four orthogonal polarization components from two digital reception signals.

The polarization allocation control unit 1142 selects the same orthogonal polarization (i.e., V/H orthogonal polarization) as the orthogonal polarization selected for the transmission polarization allocation unit 1140, and transmits an allocation control signal indicating the selected orthogonal polarization to the reception polarization allocation unit 1180. The reception polarization allocation unit 1180 outputs two polarization components corresponding to the orthogonal polarization (i.e., V/H orthogonal polarization) indicated by the allocation control signal among the four orthogonal polarization components.

As such, the antenna apparatus 10 according to the present disclosure performs the polarization conversion or performs the polarization composition and the polarization allocation, for the reception signals input from the reception antenna element 1314, and thereby can output signal components corresponding to the same orthogonal polarization as the orthogonal polarization of the downlink channel (or of the transmission beam or the transmission channels). As a result, the non-reciprocity between the uplink channel and the downlink channel can be corrected, and the deterioration of the performance of the transmission beamforming performed based on uplink channel state information (CSI) estimated from the SRS received via the uplink channel may be presented. Moreover, since the channel non-reciprocity is corrected through the signal processing for the reception signals in the antenna apparatus 10, the channel reciprocity may be secured or retained in the DU.

Amplitude-Phase Calibration

As mentioned above, in FIGS. 2A and 2B, the amplitude-phase calibration unit 1150 may calibrate variations of an amplitude change and a phase change of the polarization occurred while the RF signals moves through RF paths.

The amplitude-phase calibration unit 1150 may be implemented as one component which integratedly performs amplitude and phase calibration for a plurality of transmission/reception signals or transmission/reception channels, and alternatively, also constituted by a plurality of modules which individually perform the amplitude and phase calibration for each of the plurality of transmission/reception signals or transmission/reception channels.

Since accuracy of the polarization composition which occurs in the antenna array 130 according to the present disclosure significantly depends on the amplitudes and phases of the composed radio signals, the calibration of the amplitude and the phase increases the accuracy of the polarization composition. Therefore, the amplitude and phase calibration may also be applied to all RF paths, but may also be selectively applied only to transmission paths requiring the polarization composition among a plurality of RF transmission paths and reception paths requiring the channel non-reciprocity correction among a plurality of RF reception paths.

Figure 12:
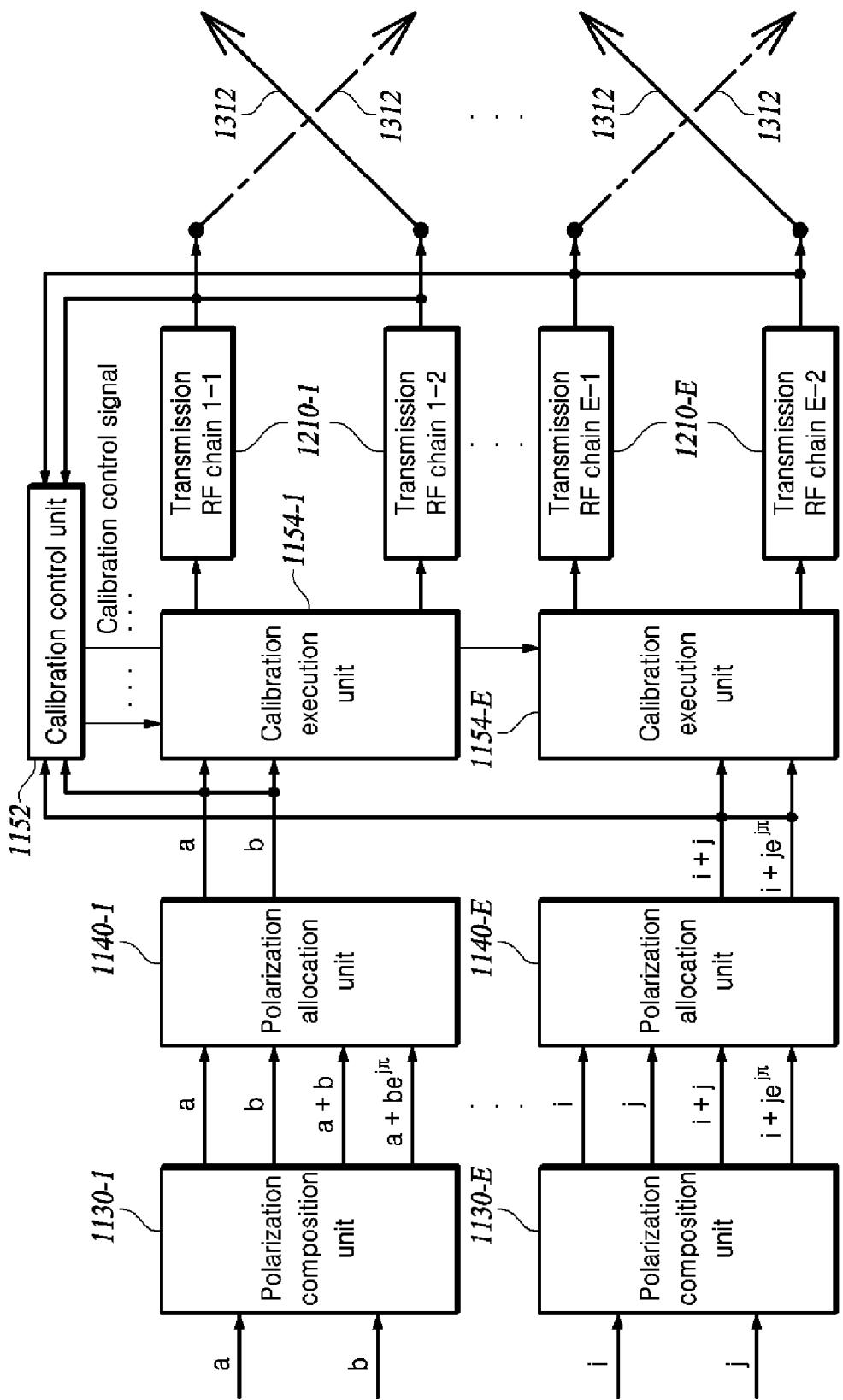
FIG. 12 is a block diagram illustrating an exemplary structure for performing transmission polarization composition calibration in the antenna apparatus according to an embodiment of the present disclosure.

FIG. 12 is a block diagram illustrating an exemplary structure for performing transmission polarization composition calibration in the antenna apparatus according to an embodiment of the present disclosure.

As illustrated in FIG. 12, the amplitude-phase calibration unit 1150 may be configured to include a calibration control unit 1152 and a plurality of calibration execution units 1154.

The correction control unit 1152 integratedly manages the amplitude and phase calibration performed with respect to a plurality of transmission channels. The calibration control unit 1152 compares the "polarization components output from the transmission polarization allocation unit 1140" and the "polarization components output from the transmission RF chain 1210" to generate a calibration control signal for controlling the amplitude and phase calibration to be performed by the calibration execution unit 1154. The calibration control signal may include an amplitude value and a phase value to be calibrated.

The calibration control unit 1152 may transmit a respective calibration control signal to each calibration execution unit 1154. Each calibration execution unit 1154 may calibrate the amplitude and the phase based on the respective calibration control signal.

As described above, among a plurality of transmission paths, the amplitude and phase calibration may also be selectively applied only to transmission paths in which the orthogonal polarization allocated to the transmission path is different from the orthogonal polarization characteristics of the transmission antenna element (therefore, the polarization composition occurs in the transmission antenna element).

Therefore, when the polarization composition does not occur in the transmission antenna element, the calibration control unit 1152 may not transmit the calibration control signal to the related calibration execution unit 1154 or may transmit a calibration control signal in which each of an amplitude value and a phase value to be calibrated is set to 0 (zero) to the related calibration execution unit 1154.

Referring to FIG. 12, since the polarization allocation unit 1140-1 outputs the polarization components "a" and "b" to two transmission channels, respectively, a transmission beam radiated from the related transmission antenna element 1312 does not involve the polarization composition. Therefore, the calibration control unit 1152 may not transmit the calibration control signal to the calibration execution unit 1154-1 or may transmit a calibration control signal in which each of an amplitude value and a phase value to be calibrated is set to 0 (zero) to the calibration execution unit 1154-1. On the contrary, since the polarization allocation unit 1140-E outputs polarization components "i+j" and "i+je$^{j\pi}$" to two transmission channels, respectively, the transmission beam radiated from the related transmission antenna element 1312 involves the polarization composition. Therefore, the calibration control unit 1152 compares the polarization components output from the transmission polarization allocation unit 1140-E and the polarization components output from transmission RF chains 1210 E-1 and 1210 E-2 to calculate a variation between the transmission RF chains 1210 E-1 and 1210 E-2, and generate the calibration control signal for controlling the amplitude and phase calibration to be performed by the calibration execution unit 1154-E. The calibration execution unit 1154-E adjusts amplitudes and phases of the polarization components from the transmission polarization allocation unit 1140-E based on the calibration control signal to compensate for variations of amplitude and phase characteristics of the RF path between the transmission RF chain 1210 E-1 and the transmission RF chain 1210 E-2.

The structure illustrated in FIG. 12 and an operation method thereof may be equally applied even to compensating for the variations of the amplitude and phase characteristics of the RF path between the reception RF chains 1210-1 to 1210-M.

Through the amplitude-phase calibration function, the polarization composition which occurs in the antenna array 130 and the channel non-reciprocity correction may be more accurately achieved. Further, the amplitude-phase calibration function is selectively applied only to the transmission paths involving the polarization composition and the reception paths involving the channel non-reciprocity correction to reduce an operation burden according to the generation of the calibration control signal of the calibration control unit 1152, which enables quick amplitude-phase calibration.

Figure 13:
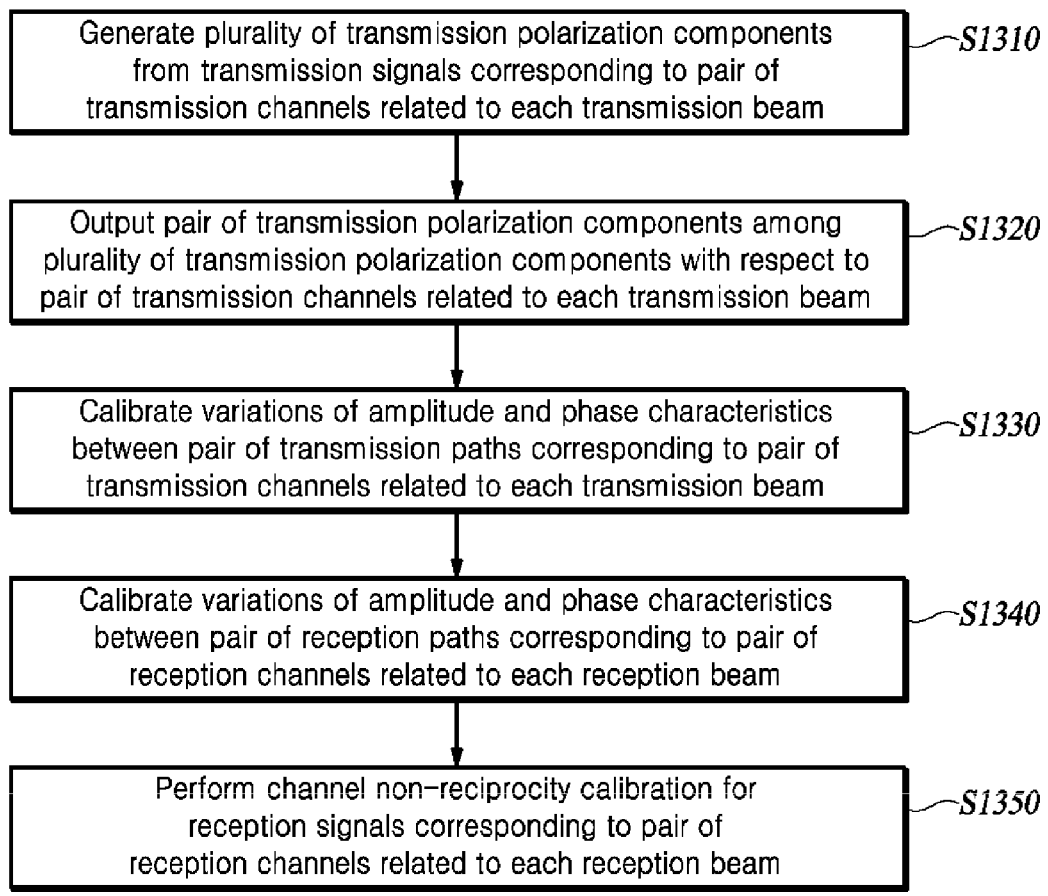
FIG. 13 is a flowchart illustrating a method performed by a multi-beam antenna apparatus using quadruple polarization according to an embodiment of the present disclosure.

FIG. 13 is a flowchart illustrating a method performed by a multi-beam antenna apparatus using quadruple polarization according to an embodiment of the present disclosure. The multi-beam antenna apparatus includes an array antenna which includes transmission antenna elements used for forming a plurality of transmission beams and reception antenna elements used for forming a plurality of reception beams.

The multi-beam antenna apparatus may generate a plurality of transmission polarization components from transmission signals corresponding to a pair of transmission channels related to each transmission beam (S1310).

The multi-beam antenna apparatus may output a pair of transmission polarization components corresponding to a first orthogonal polarization or a pair of transmission polarization components corresponding to a second orthogonal polarization among the plurality of transmission polarization components with respect to a pair of transmission channels related to each transmission beam so that spatially contiguous transmission beams have different orthogonal polarizations (S1320).

When a pair of transmission polarization components corresponding to the first orthogonal polarization are radiated to the transmission antenna elements having the first orthogonal polarization, the transmission beam having the first orthogonal polarization may be formed (that is, the polarization composition does not occur). When a pair of reception polarization components corresponding to the second orthogonal polarization are radiated to the transmission antenna elements having the first orthogonal polarization, the transmission beam having the second orthogonal polarization may be formed by the polarization composition.

The multi-beam antenna apparatus may adjust the amplitudes and the phases of the one pair of transmission polarization components in order to calibrate the variations of the amplitudes and the phase characteristics between the one pair of transmission paths corresponding to one pair of transmission channels related to each transmission beam (S1330).

The calibration of the variations of the amplitude and phase characteristics between the transmission paths may be performed only when the transmission beam has a different orthogonal polarization from the orthogonal polarization characteristics of the transmission antenna elements by the polarization composition. That is, when an orthogonal polarization of a given transmission beam is different from the orthogonal polarization characteristics of the related transmission antenna elements, the multi-beam antenna apparatus may adjust the amplitudes and the phases of a pair of transmission polarization components in order to calibrate the variations of the amplitude and phase characteristics between a pair of transmission paths related to the given transmission beam. Further, when the orthogonal polarization of the given transmission beam is the same as the orthogonal polarization characteristics of the related transmission antenna elements, the multi-beam antenna apparatus may not calibrate the variations of the amplitude and phase characteristics between a pair of transmission paths related to the given transmission beam.

The multi-beam antenna apparatus may adjust amplitudes and phases of a pair of reception signals output from a pair of reception paths in order to calibrate the variations of the amplitude and phase characteristics between a pair of reception paths corresponding to a pair of reception channels related to each reception beam (S1340).

Calibrating the variations of the amplitude and phase characteristics between the reception paths may be performed only for a pair of reception signals input from the reception antenna element having different orthogonal polarization characteristics from the corresponding transmission beam (as a result, the channel non-reciprocity calibration is required). Therefore, when orthogonal polarization characteristics of the reception antenna elements related to the given reception beam are different from the orthogonal polarization of the transmission beam formed in the spatially same direction, the multi-beam antenna apparatus may adjust the amplitudes and the phases of a pair of reception signals related to the given reception beam in order to calibrate the variations of the amplitude and phase characteristics between a pair of reception related to the given reception beam. Further, when the orthogonal polarization characteristics of the reception antenna elements related to the given reception beam are the same as the orthogonal polarization of the transmission beam formed in the spatially same direction, the multi-beam antenna apparatus may not calibrate the variations of the amplitude and phase characteristics between a pair of reception paths related to the given reception beam.

The multi-beam antenna apparatus may perform channel non-reciprocity correction for the reception signals corresponding to a pair of reception channels related to each reception beam (S1350).

In some embodiments, as a part of performing the channel non-reciprocity correction (S1350), the multi-beam antenna apparatus may generate polarization-converted signals corresponding to the orthogonal polarization of the transmission beam formed in the spatially same direction as each reception beam from the reception signals corresponding to a pair of reception channels related to each reception beam. Specifically, the multi-beam antenna apparatus performs the polarization conversion for a pair of reception signals input from the reception antenna element having the different orthogonal polarization characteristics from the orthogonal polarization of the corresponding transmission beam (as a result, the channel non-reciprocity correction is required) to output a pair of reception polarization components corresponding to the orthogonal polarization of the transmission beam formed in the spatially same direction.

In some other embodiments, as a part of performing the channel non-reciprocity correction (S1350), the multi-beam antenna apparatus may generate a plurality of reception polarization components from the reception signals corresponding to a pair of reception channels related to each reception beam. Further, the multi-beam antenna apparatus may output a pair of reception polarization components corresponding to the orthogonal polarization of the transmission beam formed in the spatially same direction among the plurality of reception polarization components with respect to a pair of reception channels related to each reception beam.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof

What is claimed is:

1. A method performed by a multi-beam antenna apparatus using two kinds of dual orthogonal polarizations, wherein the multi-beam antenna apparatus includes an array antenna including transmission antenna elements used to form a plurality of transmission beams and reception antenna elements used to form a plurality of reception beams, the method comprising:
generating a plurality of transmission polarization components from transmission signals corresponding to a pair of transmission channels related to each transmission beam;
outputting a pair of transmission polarization components corresponding to a first dual orthogonal polarization or a pair of transmission polarization components corresponding to a second dual orthogonal polarization among the plurality of transmission polarization components with respect to the pair of transmission channels related to each transmission beam so that spatially contiguous transmission beams have different dual orthogonal polarizations;
generating a plurality of reception polarization components from reception signals corresponding to a pair of reception channels related to each reception beam; and
outputting a pair of reception polarization components having the same dual orthogonal polarizations as dual orthogonal polarizations of the transmission beam formed in the spatially same direction among the plurality of reception polarization components with respect to the pair of reception channels related to each reception beam.

2. The method of claim 1, wherein when the pair of transmission polarization components corresponding to the first dual orthogonal polarization are radiated to the transmission antenna elements having the first dual orthogonal polarization, the transmission beam having the first dual orthogonal polarization is formed, and
when the pair of transmission polarization components corresponding to the second dual orthogonal polarization are radiated to the transmission antenna elements having the first dual orthogonal polarization, the transmission beam having the second dual orthogonal polarization by polarization composition is formed.

3. The method of claim 1, further comprising:
adjusting amplitudes and phases of the one-pair of transmission polarization components in order to calibrate variations of amplitude and phase characteristics between one pair of transmission paths related to each transmission beam.

4. The method of claim 1, further comprising:
adjusting, when a dual orthogonal polarization of a given transmission beam is different from the dual orthogonal polarization characteristics of the related transmission antenna elements, amplitudes and phases of the pair of transmission polarization components in order to calibrate the variations of the amplitude and phase characteristics between a pair of transmission paths related to the given transmission beam.

5. The method of claim 1, further comprising:
adjusting amplitudes and phases of the ene-pair of reception polarization components in order to calibrate variations of amplitude and phase characteristics between one pair of reception paths related to each reception beam.

6. The method of claim 1, further comprising:
adjusting, when dual orthogonal polarization characteristics of the reception antenna elements related to a given reception beam are different from the dual orthogonal polarization of the transmission beam formed in the spatially same direction, amplitudes and phases of a pair of reception signals related to the given reception beam in order to calibrate variations of the amplitude and phase characteristics between a pair of reception paths related to the given reception beam.

7. The method of claim 1, wherein the transmission antenna elements have different dual orthogonal polarization characteristics from those of the reception antenna elements.

8. The method of claim 1, wherein the transmission antenna elements have the same dual orthogonal polarization characteristics as those of the reception antenna elements.

9. A multi-beam antenna apparatus using two kinds of dual orthogonal polarizations, the apparatus comprising:
an array antenna including transmission antenna elements used for forming a plurality of transmission beams and reception antenna elements used for forming a plurality of reception beams;
a transmission polarization composition unit for generating a plurality of transmission polarization components from transmission signals corresponding to a pair of transmission channels related to each transmission beam;
a transmission polarization allocation unit for outputting a pair of transmission polarization components corresponding to a first dual orthogonal polarization or a pair of transmission polarization components corresponding to a second dual orthogonal polarization among the plurality of transmission polarization components with respect to the pair of transmission channels related to each transmission beam so that spatially contiguous transmission beams have different dual orthogonal polarizations;
a reception polarization composition unit for generating a plurality of reception polarization components from reception signals corresponding to a pair of reception channels related to each reception beam;
a reception polarization allocation unit for outputting a pair of reception polarization components having the same dual orthogonal polarizations as dual orthogonal polarizations of the transmission beam formed in the spatially same direction among the plurality of reception polarization components with respect to the pair of reception channels related to each reception beam; and
a polarization allocation control unit for transmitting an allocation control signal indicating the same dual orthogonal polarizations as dual orthogonal polarizations selected for the transmission polarization allocation unit, to the reception polarization allocation unit.

10. The multi-beam antenna apparatus of claim 9, wherein when the pair of transmission polarization components corresponding to the first dual orthogonal polarization are radiated to the transmission antenna elements having the first dual orthogonal polarization, the transmission beam having the first dual orthogonal polarization is formed, and
when the pair of transmission polarization components corresponding to the second dual orthogonal polarization are radiated to the transmission antenna elements having the first dual orthogonal polarization, the transmission beam having the second dual orthogonal polarization by polarization composition is formed.

11. The multi-beam antenna apparatus of claim 9, further comprising:
a plurality of transmission RF chains forming a plurality of transmission paths corresponding to the plurality of transmission channels and a plurality of reception RF chains forming a plurality of reception paths corresponding to the plurality of reception channels; and
an amplitude-phase calibration unit for adjusting amplitudes and phases of the pair of transmission polarization components in order to calibrate variations of amplitude and phase characteristics between one pair of transmission paths related to each transmission beam, and adjusting amplitudes and phases for the pair of reception polarization components in order to calibrate variations of amplitude and phase characteristics between one pair of reception paths related to each reception beam.

12. The multi-beam antenna apparatus of claim 11, wherein the amplitude-phase calibration unit is configured to adjust, when a dual orthogonal polarization of a given transmission beam is different from the dual orthogonal polarization characteristics of the related transmission antenna elements, amplitudes and phases of the pair of transmission polarization components in order to calibrate the variations of the amplitude and phase characteristics between a pair of transmission paths related to the given transmission beam.

13. The multi-beam antenna apparatus of claim 11, wherein the amplitude-phase calibration unit is configured to adjust, when dual orthogonal polarization characteristics of the reception antenna elements related to a given reception beam are different from the dual orthogonal polarization of the transmission beam formed in the spatially same direction, amplitudes and phases of a pair of reception signals related to the given reception beam in order to calibrate the variations of the amplitude and phase characteristics between a pair of reception paths related to the given reception beam.

14. The multi-beam antenna apparatus of claim 9, wherein the transmission antenna elements have different dual orthogonal polarization characteristics from those of the reception antenna elements.

15. The multi-beam antenna apparatus of claim 9, wherein the transmission antenna elements have the same dual orthogonal polarization characteristics as those of the reception antenna elements.

* * * * *